United States Patent Office 3,270,053
Patented August 30, 1966

3,270,053
2-(α-HALO-LOWER ALKANOYLAMINO)-
BENZOPHENONES
Earl Reeder, Nutley, and Leo Henryk Sternbach, Upper
Montclair, N.J., assignors to Hoffmann-La Roche Inc.,
Nutley, N.J., a corporation of New Jersey
No Drawing. Filed Nov. 20, 1961, Ser. No. 154,926
Claims priority, application Switzerland, Dec. 2, 1960,
13,492/60, 13,494/60
8 Claims. (Cl. 260—562)

The present application is a continuation-in-part of Serial No. 858,564, filed December 10, 1959, now abandoned, Serial No. 858,597 filed December 10, 1959, now U.S. Patent No. 3,051,701 and Serial No. 75,690, filed December 14, 1960, now abandoned, and was copending with Serial No. 149,527, filed November 2, 1961, now Patent No. 3,136,815.

This invention relates to novel 5-aryl-3H-1,4-benzodiazepin-2(1H)-ones, novel derivatives thereof and novel intermediates therefor; and processes of making the foregoing.

The novel 5-aryl-3H-1,4-benzodiazepin-2(1H)-ones and derivatives thereof to which the invention relates are selected from the group consisting of compounds of the formula (I) 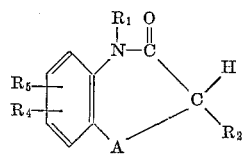

and pharmaceutically acceptable salts thereof, wherein A is selected from the group consisting of

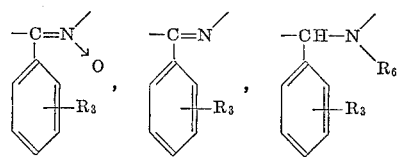

and

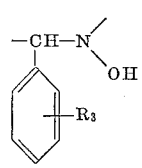

$R_1$ is selected from the group consisting of hydrogen, lower alkyl, lower alkenyl, lower alkynyl, aralkyl, hydroxy-lower alkyl and cyano-lower alkyl; $R_2$ is selected from the group consisting of hydrogen, lower alkyl, lower alkoxy-lower alkyl, phenyl and hydroxybenzyl; $R_3$, $R_4$ and $R_5$ are selected from the group consisting of hydrogen, halogen and lower alkyl; and $R_6$ is selected from the group consisting of hydrogen, lower alkyl, lower alkenyl and lower alkynyl.

As is evident from the above, the novel 5-aryl-3H-1,4-benzodiazepin-2(1H)-ones of the invention can be particularized as being compounds of the following structural formulas (II) 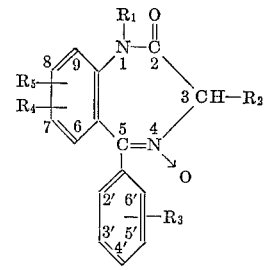

(III) 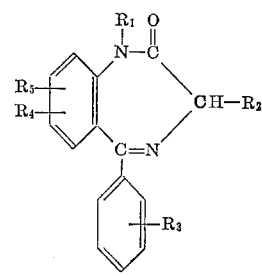

and their respective 4,5-dihydro derivatives.

The 4,5-dihydro derivatives of the compounds represented by Formula II above are represented by the following formula (IV) 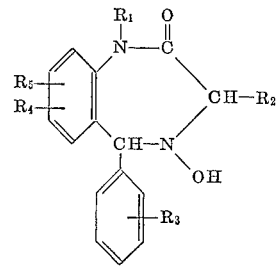

and similarly the 4,5-dihydro derivatives of compounds represented by Formula III above can be represented by the following formula (V) 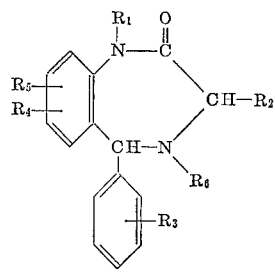

The numbering of the benzodiazepine ring system is shown in Formula II above for the purposes of convenience. The symbols R in the above Formulas I–V inclusive have the following significance. $R_1$ is selected from the group consisting of hydrogen, lower alkyl, lower alkenyl, lower alkynyl, aralkyl, hydroxy-lower alkyl and cyano-lower alkyl; $R_2$ is selected from the group consisting of hydrogen, lower alkyl, lower alkoxy-lower alkyl, phenyl and hydroxybenzyl; $R_3$, $R_4$ and $R_5$ are selected from the group consisting of hydrogen, halogen and lower alkyl; $R_6$ is selected from the group consisting of hydrogen, lower alkyl, lower alkenyl and lower alkynyl.

In addition to the compounds within the scope of Formulas I–V above there are also encompassed within the invention the pharmaceutically acceptable salts of said compounds. Certain compounds of the above formula form pharmaceuticaly acceptable acid addition salts and pharmaceutically acceptable quaternary ammonium salts. Thus the basic compounds of the invention, i.e. the compounds of Formulas III, IV and V above, form pharmaceutically acceptable acid addition salts with inorganic and organic acids; i.e. the hydrohalic acids such as hydrochloric acid and hydrobromic acid; with other mineral acids such as sulfuric acid, phosphoric acid, nitric acid and the like; and with organic acids such as tartaric acid, citric acid, camphorsulfonic acid, ethanesulfonic acid, toluenesulfonic acid, salicylic acid, ascorbic acid, maleic acid, succinic acid, mandelic acid, formic acid, acetic acid, and the like. Also the compounds containing a tertiary amino nitrogen atom in the 4-position, i.e. the compounds of Formula V wherein $R_6$ is other than hydrogen, form pharmaceutically acceptable quaternary salts with conventional quaternizing agents, such as lower alkyl halides; and the like.

As used in this disclosure the terms hereinbelow defined have the following significance. The term lower alkyl refers to such straight chain and branched chain lower alkyl groups as methyl, ethyl, propyl, isopropyl, butyl, isobutyl, t-butyl and the like. The term lower alkenyl refers to groups such as allyl, butenyl (including the various isomers) and the like. The term lower alkenyl refers to groups such as propargyl, and the like. The term cyano-lower alkyl refers to groups such as β-cyanoethyl, and the like. The term hydroxyl-lower alkyl refers to groups such as hydroxymethyl and β-hydroxyethyl. The term lower alkoxy-lower alkyl refers to groups such as methoxymethyl, and the like. The term halogen refers to all four halogens, i.e. iodine, bromine, chlorine and fluorine. The term α-halo-lower alkanoyl refers to acyl groups bearing a halogen substituent on the α-carbon atom, i.e. groups such as chloroacetyl, bromoacetyl, α-bromopropionyl, and the like.

The following paragraphs contain a general outline of the processes of the invention and represent merely a synopsis of all the processes of the invention. These processes are set forth in detail in the examples of this disclosure. The novel processes and intermediates, as well as the products corresponding to Formula I (i.e. to Formulas II–V) are part of the invention.

The compounds of Formula II may be synthesized by several methods, for example a 2-aminobenzophenone can be reacted with hydroxylamine or a salt thereof, such as hydroxylamine hydrochloride, in a medium such as ethanol, to form a 2-aminobenzophenone oxime, which can then be acylated with an α-halo-lower alkanoyl halide in the presence of a base, e.g. an alkali hydroxide, for example an alkali metal hydroxide such as sodium hydroxide. This reaction yields a 2-(α-halo-lower alkanoylamino)-benzophenone oxime which, after further treatment with one mole of base, is converted to a 5-phenyl-3H-1,4-benzodiazepin-2(1H)-one 4-oxide (represented by Formula II). Another method of obtaining the same compounds is by cyclizing a 2-aminobenzophenone oxime by means of a reaction with an α-halo-lower alkanoyl halide in the presence of an acid, such as glacial acetic acid. This reaction produces, for example, a 2-halomethyl-4-phenyl-quinazoline 3-oxide, which can then be converted to the corresponding compound represented by Formula II by treatment with an alkali hydroxide, for example an alkali metal hydroxide such as sodium hydroxide.

Treatment of either a 2-methylamino-5-phenyl-3H-1,4-benzodiazepine 4-oxide or a 2-(N-methylacetamido)-5-phenyl-3H-1,4-benzodiazepine 4-oxide with a strong acid, for example a hydrohalic acid such as hydrochloric acid, provides another method of producing compounds of Formula II.

Oxidation of a 5-phenyl-3H-1,4-benzodiazepin-2(1H)-one (the methods of synthesis of which will be outlined below) with hydrogen peroxide provides still another route to the compounds of Formula II.

The compounds of Formula III (i.e. 5-phenyl-3H-1,4-benzodiazepin-2(1H)-ones) can also be prepared by a variety of methods. For example a 5-phenyl-3H-1,4-benzodiazepin-2(1H)-one 4-oxide can be reduced with phosphorus trichloride or with hydrogen in the presence of a Raney nickel catalyst. Another route is by treating a 2-(N - methylacetamido) - 5-phenyl-3H-1,4-benzodiazepine with a strong acid, for example a hydrobalic acid such as hydrochloric acid. Compounds corresponding to Formula III can also be produced by reacting a 2-aminobenzophenone with an α-halo-lower alkanoyl halide to form a 2-(α-halo-lower alkanoylamino)-benzophenone, which can then be reacted with ammonia in alcoholic solution to yield the final product. Still another method is by cyclizing a 2-(aminoacetamido)-benzophenone. These compounds, i.e. the 2-(aminoacetamido)-benzophenones, are not a part of the present invention but their preparation is set forth in the examples below in order that the present disclosure may be complete. These 2-(aminoacetamido)-benzophenones can cyclize spontaneously to form compounds corresponding to Formula III. For example, a 2-(aminoacetamido)-benzophenone can be placed in a suspension of methanolic ammonia and subsequently, after a period of several hours, for example overnight, the corresponding benzodiazepine represented by Formula III can be recovered. The cyclization can be accelerated by heating. The heating can be accomplished by heating the 2-(aminoacetamido)-benzophenone compound per se or said compound can be dissolved in an inert organic solvent and then heated.

The compounds of Formula III can also be prepared directly from a 2-aminobenzophenone via reaction with an α-amino acid. In those compounds wherein $R_2$ is hydrogen, the α-amino acid utilized is glycine. This reaction, i.e. of 2-aminobenzophenone with an α-amino acid, is equally capable of being carried out with an α-amino acid ester, for example a lower alkyl ester of an α-amino acid. Thus where $R_2$ is hydrogen, a 2-aminobenzophenone can be reacted either with glycine or glycine ethyl ester to obtain a compound corresponding to Formula III. Where $R_2$ is other than hydrogen, α-amino acids having the formula $R_2$—CH$_2$—(NH$_2$)—COOH, and esters of such acids, are used to introduce the group $R_2$ into the final compound. Typical α-amino acids used in this process wherein $R_2$ is other than hydrogen are, for example, alanine, tyrosine, α-aminophenylacetic acid and the like. The above reactions, both where $R_2$ is hydrogen and is not hydrogen, are preferably effected in a solvent such as pyridine, dimethylformamide, and the like. It is also preferable to utilize one of the materials, or a fraction thereof, present in the form of the salt of a strong organic or inorganic acid, such as glycine hydrochloride, glycine ethyl ester hydrochloride and pyridine hydrochloride.

The 2 - (N - methylacetamido) - 5 - phenyl - 3H - 1,4-benzodiazepine 4-oxide compounds as well as the 2-(N-methylacetamido) - 5 - phenyl - 3H - 1,4 - benzodiazepine compounds referred to above are not a part of the present invention, but the preparation of novel compounds is set forth below in the examples in order that the present disclosure may be more complete. Similarly, the 2-methylamino - 5 - phenyl - 3H - 1,4 - benzodiazepine 4 - oxides referred to above are not part of this invention, but also, the preparation of novel compounds is set forth in the examples below in order that the present disclosure may be more complete.

The 4,5-dihydro derivatives corresponding to Formulas IV and V can be produced respectively from the compounds of Formulas II and III by reduction. For example, compounds corresponding to Formula II can be reduced with hydrogen in the presence of a platinum oxide catalyst to yield 4-hydroxy-5-phenyl-4,5-dihydro-3H-1,4-benzodiazepin-2(1H)-ones corresponding to Formula IV and compounds corresponding to Formula II above can be similarly reduced to yield compounds corresponding to Formula V wherein $R_6$ is hydrogen.

The compounds corresponding to Formulas II–V wherein $R_1$ is hydrogen and thus corresponding to Formula V wherein $R_6$ is hydrogen can be modified so that $R_1$ and $R_6$ are other than hydrogen by a variety of methods. Compounds of Formulas II–V wherein $R_1$ is other than hydrogen can be obtained by reacting corresponding compounds wherein $R_1$ is hydrogen with diazomethane, di-lower alkyl sulfate, lower alkyl halide, aralkyl halide, lower alkenyl halide, lower alkynyl halide or acrylonitrile in a medium such as ether, benzene, alcohol, dimethylformamide or dioxane. Also, the -(1H)- compounds can be reacted with p-formaldehyde to yield a compound wherein $R_1$ is hydroxymethyl. Further, the compounds of II–V, wherein $R_1$ is other than hydrogen can be obtained directly from 2-(N-substituted)-aminobenzophenones. Compounds of Formula V wherein $R_1$ is other than hydrogen and $R_6$ is hydrogen can be converted into corresponding compounds wherein $R_6$ is other than hydrogen by reaction with lower alkyl halide, lower alkenyl halide or lower alkynyl halide. By alkylation, alkenylation or alkynylation of compounds of Formula V wherein $R_1$ and $R_6$ are both hydrogen any of four reaction products can be obtained by altering the conditions of the reaction. More explicitly, the four reaction products which can be obtained are those where the 1-position hydrogen alone is replaced, those where the 4-position hydrogen alone is replaced, those where both the 1- and 4-position hydrogens are simultaneously replaced and those wherein the 4-position nitrogen atom is quaternized. Thus treatment of a solution of a compound of Formula V wherein both $R_1$ and $R_6$ are hydrogen with an excess of lower alkyl, lower alkenyl or lower alkynyl halide for a short period of time gives the corresponding derivative wherein $R_6$ is converted to lower alkyl, lower alkenyl or lower alkynyl, while prolonged heating results in the quaternization of the 4-position nitrogen atom. On the other hand, by using sodium methoxide, sodium hydride, or the like, to form the sodio derivative of the 1-position nitrogen atom, and reacting this with an equivalent amount of lower alkyl, lower alkenyl or lower alkynyl halide, the corresponding compound of Formula V wherein only the 1-position nitrogen atom is substituted is obtained. Using an excess of lower alkyl, lower alkenyl or lower alkynyl halide and prolonged heating with a sodio derivative of a compound of Formula V wherein either both $R_1$ and $R_6$ are hydrogen, or wherein $R_1$ alone is hydrogen, results in the 1,4-disubstituted compound wherein both $R_1$ and $R_6$ are each selected from the group consisting of lower alkyl, lower alkenyl, and lower alkynyl. Further, as discussed above, this disubstituted compound can also be obtained by heating a compound wherein $R_1$ is other than hydrogen and $R_6$ is hydrogen with an excess of lower alkyl halide, lower alkenyl halide or lower alkynyl halide.

The 2-aminobenzophenone compounds used as starting materials in numerous processes of the invention can themselves be prepared by a variety of methods. Novel 2-aminobenzophenone compounds produced by the methods of the invention and used in the syntheses of the invention are a part of the invention. In one method of preparing the 2-aminobenzophenone compounds a 2-acetamidobenzoic acid or a 2-aminobenzoic acid can be reacted with acetic anhydride to form a 2-methyl-4H-3,1-benzoxazin-4-one which can then be reacted with a Grignard agent, for example, a phenyl Grignard reagent such as phenyl magnesium bromide, to form a 2-acetamidobenzophenone. 2-acetamidobenzophenone compounds can be hydrolyzed by standard methods, such as by the use of ethanol and hydrochloric acid, to yield a 2-aminobenzophenone. Another method of preparing the 2-aminobenzophenones is to condense a benzoyl halide with an aniline compound, and then hydrolyze the formed intermediate to obtain the desired product.

2-aminobenzophenones wherein the nitrogen atom bears alkyl, alkenyl and aralkyl substituents can be formed by reacting a 2-aminobenzophenone with tosylchloride to form a 2-tosylamidobenzophenone. The hydrogen atom of the tosylamino group can be replaced by the desired substituent and the desired N-substituted 2-aminobenzophenone obtained by subsequently splitting off the tosyl group. One way of splitting off the tosyl group is by heating the N-substituted 2-aminobenzophenone in the presence of acid.

It is to be understod from the above synoptic discussion of the processes of this invention that the invention includes a variety of intermediates, e.g. 2-aminobenzophenones, N-substituted 2-aminobenzophenones, 2-aminobenzophenone oximes, N-substituted 2-aminobenzophenone oximes, 2-methyl-4H-3,1-benzoxazin-4-ones and others as mentioned above, as well as the compounds corresponding to Formula I (i.e. to Formulas II–V).

The compounds represented by Formula I (i.e. to Formulas II–V) inclusive are useful as sedatives, muscle relaxants and anticonvulsants. They can be administered by incorporating therapeutic dosages in a conventional liquid or solid vehicle, to provide elixirs, suspensions, capsules, tablets, powders and the like, according to accepted pharmaceutical practice. The various compounds corresponding to Formula I are also useful as intermediates in the synthesis of other compounds corresponding to Formula I, as discussed above and illustrated in the examples.

In the following examples the temperatures referred to are all in the centigrade scale.

The following examples illustrate the compounds and processes of the invention.

Examples 1

A mixture of 16.8 g. of 2-aminobenzophenone, 11.9 g. of glycine ethyl ester hydrochloride and 200 ml. of pyridine was heated to reflux. After one hour, 20 ml. of pyridine were distilled off. The solution was refluxed for 15 hours, then 11.9 g. of glycine ethyl ester hydrochloride were added and the refluxing was continued for an additional 4 hours. The reaction mixture was concentrated in vacuo, then diluted with ether and water. The reaction product, 5-phenyl-3H-1,4-benzodiazepin-2(1H)-one, crystallized out, was filtered off and then recrystallized from acetone in the form of colorless rhombic prisms, M.P. 182–183°.

Example 2

4.4 g. (0.02 mole) of 5-phenyl-3H-1,4-benzodiazepin-2(1H)-one was suspended in 75 cc. methanol; 1.1 g. (0.022 mole) of sodium methylate was added. The resulting clear solution was stirred at room temperature for 10 minutes. The reaction mixture was concentrated to dryness in vacuo. 95 cc. dimethylformamide were added to the brownish residue. A clear solution resulted at first with the formation of a greyish precipitate after a short time. 3.8 cc. (8.52 g., 0.06 mole) of methyl iodide were added dropwise, the temperature of the reaction mixture rising to 30°. After 1 hour stirring at room temperature, the mixture was poured into 1000 cc. of ice water. After 1 hour stirring in the cold, 2 g. of sodium thiosulfate was added and the cold reaction mixture was extracted in a separatory funnel with four 300 cc. portions of methylene chloride. The combined methylene chloride extracts were washed with ice water, dried with $Na_2SO_4$ and concentrated to a thick oil. On cooling in the icebox overnight, 1-methyl-5-phenyl-3H-1,4-benzodiazepin-2-(1H)-one crystallized in white prisms. M.P.=153.5–155.5°.

Example 3

A solution of 17.5 g. of 5-phenyl-3H-1,4-benzodiazepin-2(1H)-one in 100 cc. of glacial acetic acid was hydrogenated in the presence of 1.2 g. of platinum oxide at room temperature and atmospheric pressure. The hydrogen uptake stopped after 3 hours following the absorption of 1 mole of hydrogen. The mixture was filtered and the solution was concentrated in vacuo to dryness. The residue was dissolved in methylene chloride and extracted with a large volume of dilute hydrochloric acid. The methylene chloride solution was discarded and the aqueous layer was cooled, made alkaline and extracted again with methylene chloride. The organic layer was dried, filtered and concentrated in vacuo to dryness. The residue, 5-phenyl-4,5-dihydro-3H-1,4-benzodiazepin-2(1H)-one, was crystallized from acetone, then recrystallized from a mixture of acetone and petroleum ether to obtain colorless needles melting at 147–148°.

Example 4

Into a stirred, cooled (10–15°) solution of 26.2 g. (0.1 mol) of 2-amino-5-chlorobenzophenone β-oxime in 150 ml. of dioxane were introduced in small portions 12.4 g. (0.11 mol) of chloracetyl chloride and an equivalent amount of 3N sodium hydroxide. The chloracetyl chloride and sodium hydroxide were introduced alternately at such a rate so as to keep the temperature below 15° and the mixture neutral or slightly alkaline. The reaction was completed after 30 minutes. The mixture was slightly acidified with hydrochloric acid, diluted with water and extracted with ether. The ether extract was dried and concentrated in vacuo. Upon the addition of ether to the oily residue, the product, 2-chloroacetamido-5-chlorobenzophenone β-oxime, crystallized in colorless prisms melting at 161–162°.

Example 5

600 ml. of acetic anhydride were added to a solution of 100 g. of 7-chloro-2-methylamino-5-phenyl-3H-1,4-benzodiazepine 4-oxide in 1.2 liters of dry pyridine. The mixture was left at room temperature for 14 hours and concentrated in vacuo. The residue was crystallized from a mixture of ether and petroleum ether to obtain 7 - chloro - 2 - (N - methylacetamido)-5-phenyl-3H-1,4-benzodiazepine 4-oxide, M.P. 186–187°.

250 ml. of 1 N hydrochloric acid was added at room temperature to a solution of 84.4 g. (0.25 mol) of 7-chloro - 2 - (N - methylacetamido) - 5 - phenyl - 3H-1,4-benzodiazepine 4-oxide in 1250 ml. of dioxane (prepared by heating). The mixture was left at room temperature for 14 hours, diluted with ice water, made strongly alkaline with sodium hydroxide and extracted with ether to remove impurities. The product, 7-chloro-5-phenyl-3H-1,4-benzodiazepin-2-(1H)-one oxide, remained in the aqueous alkaline solution which was neutralized with acetic acid and extracted with methylene chloride. The methylene chloride solution was dried and concentrated to a small volume. The pure, crystalline product was precipitated by the addition of petroleum ether and crystallized from alcohol, M.P. 235–236°, with dec.

Example 6

A solution of 20 g. of 7-chloro-2-methylamino-5-phenyl-3H-1,4-benzodiazepine 4-oxide hydrochloride in 200 ml. of water was left at room temperature. After 30 days this solution was extracted several times with benzene. The benzene solution was concentrated in vacuo. The crude residual oil was purified by crystallization from a mixture of acetone and ether to obtain 7-chloro - 5 - phenyl-3H-1,4-benzodiazepin-2(1H)-one 4-oxide.

Example 7

To a suspension of 10.2 g. (30 mmols) of 6-chloro-2-chloromethyl-4-phenylquinazoline 3-oxide hydrochloride in 150 ml. of dioxane were added 60 ml. of 1 N sodium hydroxide. The mixture was left at room temperature for 14 hours, concentrated in vacuo to a small volume, diluted with ice cold 3 N sodium hydroxide and extracted with methylene chloride. The methylene chloride solution was discarded. The alkaline solution containing the reaction product was acidified with hydrochloric acid and extracted with methylene chloride. The methylene chloride solution was dried, concentrated in vacuo and the residue was crystallized from alcohol to obtain 7-chloro-5-phenyl-3H-1,4-benzodiazepin-2-(1H)-one 4-oxide.

Example 8

20 ml. of 1 N sodium hydroxide were added to a solution of 6.4 g. (20 mmols) of 2-chloracetamido-5-chlorobenzophenone β-oxime. After 15 hours the mixture was diluted with ice cold 1 N sodium hydroxide and extracted with ether. The ether extract was discarded. The alkaline solution was acidified with hydrochloric acid and extracted with methylene chloride. The methylene chloride solution was concentrated to a small volume and then diluted with petroleum ether to obtain 7-chloro-5-phenyl-3H-1,4-benzodiazepin-2-(1H)-one 4-oxide.

Example 9

To a stirred suspension of 10 g. (35 mmols) of 7-chloro - 5 - phenyl-3H-1,4-benzodiazepin-2(1H)-one 4-oxide in approximately 150 ml. of methanol was added in portions an excess of a solution of diazomethane in ether. After about one hour, almost complete solution had occurred and the reaction mixture was filtered. The filtrate was concentrated in vacuo to a small volume and diluted with ether and petroleum ether. The reaction product, 7 - chloro - 1 - methyl-5-phenyl-3H-1,4-benzodiazepin - 2(1H) - one 4 - oxide, crystallized in colorless prisms. The product was filtered off and recrystallized from acetone, M.P. 188–189°.

Example 10

2.78 g. (52.5 mmols) of sodium methoxide were added to a stirred, warm solution of 15 g. (52.5 mmols) of 7-chloro-5-phenyl-3H-1,4-benzodiazepin-2(1H)-one 4-oxide in 700 ml. of methanol. After 5 minutes, 5 ml. (52.5 mmols) of dimethylsulfate were added. The reaction mixture was refluxed for one hour, concentrated in vacuo to a small volume and diluted with ether and petroleum ether. The crystals which formed were filtered off and washed with water to obtain 7-chloro-1-methyl-5-phenyl-3H-1,4-benzodiazepin-2(1H)-one 4-oxide.

Example 11

14.3 g. of 7-chloro-5-phenyl-3H-1,4-benzodiazepin-2(1H)-one 4-oxide were dissolved in 300 ml. of dioxane and hydrogenated in the presence of 20 g. of Raney nickel at atmospheric pressure and room temperature. The hydrogenation was stopped after the absorption of one mol of hydrogen. The reaction mixture was filtered, concentrated in vacuo to a small volume and diluted with ether and petroleum ether. The precipitated crystals were recrystallized from acetone. The product, 7-chloro-5-phenyl-3H-1,4-benzodiazepin-2(1H)-one, formed colorless plates melting at 216–217°.

Example 12

A solution of 15 g. of 7-chloro-5-phenyl-3H-1,4-benzodiazepin-2(1H)-one 4-oxide and 25 ml. of phosphorous trichloride in 700 ml. of chloroform was refluxed for 30 minutes. The solution was then poured on ice, the mixture was made alkaline with 50% sodium hydroxide and then the organic layer was separated. The aqueous layer was extracted with methylene chloride. Then the organic layers were combined, dried, filtered over diatomaceous earth to remove a fine amorphous impurity and the filtrate was concentrated in vacuo to dryness. The residue was crystallized from acetone to obtain 7 - chloro-5-phenyl-3H-1,4-benzodiazepin-2(1H)-one.

Example 13

25 g. of anhydrous hydrogen chloride were introduced into a stirred mixture containing 23.2 g. of 2-amino-5- chlorobenzophenone, 15 g. of glycine and 250 ml. of pyridine. 25 ml. of pyridine were distilled off and the mixture was refluxed for 24 hours. 50 ml. of pyridine were then distilled off and an additional 25 g. of hydrogen chloride were introduced, followed by the distillation of 50 ml. of pyridine. Fresh pyridine was added after each distillation in order to keep the volume constant. The mixture was refluxed for an additional 24 hours and was then concentrated in vacuo. The residue was partitioned between benzene and water and then the benzene layer was washed with water. After drying over magnesium sulfate, the benzene solution was concentrated in vacuo. The residue, 7-chloro-5-phenyl-3H-1,4-benzodiazepin - 2(1H) - one, was crystallized from a mixture of ether-petroleum ether and washed with boiling ether.

Example 14

A mixture of 20 g. of 7-chloro-2-methylamino-5-phenyl-3H-1,4-benzodiazepine 4-oxide, 300 ml. of chloroform and 38 ml. of phosphorus trichloride was refluxed for one hour, then concentrated in vacuo to dryness. To the residue, methylene chloride, an excess of 50% potassium hydroxide and ice were added. The mixture was stirred energetically to achieve complete neutralization and the precipitated reaction product was filtered off. The methylene chloride solution was then separated from the aqueous filtrate, dried with sodium sulfate, filtered and concentrated in vacuo to obtain an additional quantity of the crude product. The crude fractions were combined and crystallized from acetone to obtain rhombic, yellow plates of 7-chloro-2-methylamino-5-phenyl-3H-1,4-benzodiazepine, M.P. 240–241°.

2 g. of 7-chloro-2-methylamino-5-phenyl-3H-1,4-benzodiazepine were dissolved with slight heating in a mixture of 10 ml. of acetic anhydride and 20 ml. of pyridine. The solution was left at room temperature for 16 hours and concentrated in vacuo. The residue, 7-chloro-2-(N-methylacetamido)-5-phenyl-3H-1,4 - benzodiazepine, was crystallized from a mixture of ether and petroleum ether, M.P. 162°.

10 ml. of 1 N hydrochloric acid were added at room temperature to a solution of 3.2 (10 mmols) of 7-chloro-2-(N-methylacetamido)-5-phenyl-3H-1,4 - benzodiazepine and 50 ml. of dioxane. After 15 hours, the precipitated starting material was filtered off. The filtrate was diluted with water and extracted with methylene chloride. The methylene chloride solution was dried, concentrated in vacuo and the residue was crystallized by the addition of acetone to obtain crystalline 7-chloro-5-phenyl-3H-1,4-benzodiazepin-2(1H)-one.

Example 15

Into a stirred, cooled (10–15°) solution of 92.4 g. (0.4 mol) of 2-amino-5-chlorobenzophenone in 500 ml. of dioxane were introduced simultaneously in small portions 56.5 g. (0.5 mol) of chloroacetyl chloride and 166 ml. of 3 N sodium hydroxide at such a rate as to maintain a neutral reaction. After the addition was completed, the mixture was acidified, concentrated in vacuo to a small volume and diluted with water. The reaction product, 2-chloroacetamido-5 - chlorobenzophenone, was extracted with benzene and crystallized from a mixture of benzene, ether and petroleum ether, M.P. 117–118°.

5 g. of 2-chloroacetamido-5-chlorobenzophenone in 200 ml. of methanolic ammonia were stirred at room temperature until all the compound had dissolved. The solution was then allowed to stand for 5 days at room temperature. The clear amber solution was then concentrated to dryness in vacuo. The residue was partitioned between 300 ml. of diethyl ether and 100 ml. of water. The ether layer was diluted with 150 ml. of benzene and extracted with 180 ml. of 2 N hydrochloric acid in several portions. The hydrochloric acid extract containing the reaction product was neutralized with sodium hydroxide solution and ice and then extracted with methylene chloride. The extract was dried over magnesium sulfate and concentrated in vacuo. The residue, on the addition of diethyl ether, gave 7-chloro-5-phenyl-3H-1,4-benzodiazepin-2(1H)-one.

Example 16

A mixture of 23.15 g. (0.1 mol) of 2-amino-5-chlorobenzophenone, 20.8 g. (0.15 mol) of glycine ethyl ester hydrochloride and 50 ml. of pyridine was heated. The pyridine was slowly distilled off while the temperature of the reaction mixture was maintained at 120 to 125° by the addition of fresh pyridine to the mixture at the same rate as it was distilled off. The distillation was continued for 4 hours, a total of 120 ml. of pyridine being collected. The mixture was then concentrated in vacuo to a syrup and partitioned between 200 ml. of benzene and 200 ml. of water. The extraction was repeated with 200 ml. of water. During the second washing, some of the product began to crystallize and was filtered off. The benzene solution was separated, diluted with 100 ml. of petroleum ether and left at 0° for 15 hours. The crystalline product, 7-chloro-5-phenyl-3H-1,4-benzodiazepin-2(1H)-one, was filtered off, washed with some benzene until almost colorless and finally with some petroleum ether. The product was then recrystallized from acetone.

Example 17

A solution of 2.7 g. (10 mmols) of 7-chloro-5-phenyl-3H-1,4-benzodiazepin - 2(1H) - one in 15 ml. of glacial acetic acid was heated with stirring on a steam bath with 1.2 ml. of a 30% solution (10 mmols) of hydrogen peroxide. Three additional 0.6 ml. portions of hydrogen peroxide were added at two hour intervals and then the heating was continued for a total of 10 hours. After standing for 36 hours at room temperature, the solution was diluted with water and ice, neutralized by the addition of an equivalent amount of potassium carbonate solution and extracted with methylene chloride. The methylene chloride solution was then extracted portionwise with 160 ml. of 3 N hydrochloric acid in order to remove unreacted starting material. The organic layer was dried, concentrated in vacuo and the residue was crystallized from methylene chloride, ether and petroleum ether to obtain 7-chloro-5-phenyl-3H-1,4-benzodiazepin-2(1H)-one 4-oxide.

Example 18

7.6 g. of 7-chloro-5-phenyl - 3H - 1,4 - benzodiazepin-2(1H)-one 4-oxide were dissolved in 150 ml. of glacial acetic acid and hydrogenated at room temperature and atmospheric pressure in the presence of 0.6 g. of platinum oxide until the hydrogen uptake had slowed down considerably. This occurred after 6 hours with the absorption of about 1.5 mols of hydrogen. The reaction mixture was then heated, diluted with more glacial acetic acid to dissolve the precipitated hydrogenation product and filtered over diatomaceous earth. The filtrate was concentrated in vacuo to a small volume and the crystalline reaction product was filtered off. After recrystallization from acetic acid, the product, 7-chloro-4-hydroxy-5-phenyl-4,5-dihydro-3H-1,4-benzodiazepin-2(1H)-one, formed colorless needles melting at 215–216°.

Example 19

10.8 g. of 7-chloro-5-phenyl-3H-1,4-benzodiazepin-2(1H)-one were dissolved in 120 ml. of glacial acetic acid and hydrogenated in the presence of 1.2 g. of platinum oxide at room temperature and atmospheric pressure. Absorption of hydrogen stopped after the absorption of one mol (one hour). The mixture was filtered, the filtrate was concentrated in vacuo and the residue was crystallized from dilute dimethylformamide. The pure product, 7-chloro - 5 - phenyl-4,5-dihydro-3H-1,4-benzodiazepin-2(1H)-one, melted at 184.5–185.5°.

Example 20

10 ml. of 1 N sodium hydroxide were added at room temperature to a solution of 2.84 g. (10 mmols) of 6-methyl - 2 - chloromethyl - 4 - phenylquinazoline 3-oxide in 75 ml. of dioxane. After 15 hours, the mixture was diluted with ice water and extracted with ether. The ether extract containing unchanged starting material was discarded. The aqueous layer was acidified with dilute hydrochloric acid and extracted with methylene chloride. The methylene chloride solution was dried, concentrated in vacuo and the residue crystallized from a mixture of methylene chloride and petroleum ether. The 7-methyl-5-phenyl-3H-1,4-benzodiazepin-2(1H)-one 4-oxide formed colorless rhombic plates melting at 226–227°.

Example 21

20 ml. of 1 N sodium hydroxide were added to a suspension of 7 g. (20 mmols) of 6-bromo - 2 - chloromethyl-4-phenylquinazoline 3-oxide in 75 ml. of dioxane. The mixture was left at room temperature for 14 hours, concentrated in vacuo to a small volume, diluted with ice cold 3 N sodium hydroxide and extracted with methylene chloride. The methylene chloride solution was discarded. The alkaline solution containing the reaction product was acidified with hydrochloric acid and extracted with methylene chloride. The methylene chloride solution was dried, concentrated in vacuo and the residue crystallized from a mixture of methylene chloride and petroleum ether. The product, 7-bromo - 5 - phenyl-3H-1,4-benzodiazepin-2(1H)-one 4-oxide, melted at 230–231°.

Example 22

20 ml. of acetic anhydride were added to a solution of 3.9 g. of 7,8-dimethyl-2-methylamino-5-phenyl-3H-1,4-benzodiazepine 4-oxide in 20 ml. of pyridine. The solution was left at room temperature for 20 hours and then concentrated in vacuo. The residue was crystallized from a mixture of acetone and ether to obtain 7,8-dimethyl-2-(N-methylacetamido)-5-phenyl - 3H - 1,4 - benzodiazepine 4-oxide in the form of colorless prisms melting at 193–194°, with dec.

6 ml. of 1 N hydrochloric acid were added at room temperature to a solution of 2 g. (6 mmols) of 7,8-dimethyl-2-(N-methylacetamido) - 5 - phenyl-3H-1,4-benzodiazepine 4-oxide in 30 ml. of dioxane. After 15 hours, ice water and 3 N sodium hydroxide were added and the mixture was extracted with methylene chloride. The organic layer containing impurities was discarded. The aqueous alkaline solution was acidified with dilute hydrochloric acid and extracted with methylene chloride. The methylene chloride solution was dried and concentrated in vacuo. The residue, 7,8-dimethyl-5-phenyl-3H-1,4-benzodiazepin-2(1H)-one 4-oxide, crystallized from a mixture of methylene chloride and petroleum ether in the form of colorless plates melting at 234–235°.

Example 23

500 g. of p-bromoaniline were added with stirring at 120° to 995 g. of p-toluoyl chloride, causing a strong evolution of hydrogen chloride. The mixture solidified and was molten by heating to 200°. 500 g. of anhydrous zinc chloride were added with stirring causing again the evolution of hydrogen chloride. The mixture was heated for 2 hours to 230° and then poured with stirring into 2 liters of 0.5 N hydrochloric acid. The precipitated solid was filtered off, pulverized, suspended in 4 liters of 0.5 N hydrochloric acid and refluxed for one hour. The mixture was cooled. The wet resinous material was filtered off and dissolved in a mixture of 1.5 liters of acetic acid and 0.75 liter of concentrated hydrochloric acid. The solution was refluxed for 18 hours and concentrated in vacuo. To the residue were added 3 liters of benzene and an excess of sodium hydroxide. The precipitated p-toluic acid sodium salt was filtered off and the aqueous layer discarded. The benzene layer was washed with 2 N sodium hydroxide and then with an excess of 2 N hydrochloric acid. The benzene layer was dried and concentrated, yielding crude 2-amino-5-bromo-4'-methylbenzophenone. After crystallization from a mixture of benzene and petroleum ether, the product formed yellow plates melting at 105–106°.

A mixture of 50 g. of 2-amino-5-bromo-4'-methylbenzophenone, 28 g. of hydroxylamine hydrochloride and 250 ml. of alcohol was refluxed for 15 hours. The solution was neutralized with aqueous sodium carbonate, diluted with 100 ml. of water and 100 ml. of benzene. The precipitated crystals of 2-amino-5-bromo-4'-methylbenzophenone α-oxime were filtered off. From the filtrate the benzene layer was separated, dried and partly concentrated in vacuo yielding an additional quantity of the product. The mother liquors were diluted with petroleum ether to obtain 2-amino-5-bromo-4'-methylbenzophenone β-oxime. The α-oxime was crystallized from ether and melted at 204–205°. The β-oxime was crystallized from a mixture of benzene and petroleum ether and melted at 115–116°.

Into a stirred, cooled solution (10–15°) of 9.15 g. of 2-amino-5-bromo-4'-methylbenzophenone α-oxime in 45 ml. of dioxane were introduced in small portions 3 ml. of chloroacetyl chloride and an equivalent amount of 3 N sodium hydroxide. The chloroacetyl chloride and sodium hydroxide were added alternately at a rate so as to keep the temperature below 15° and the mixture neutral or slightly alkaline. After 30 minutes, the mixture was acidified to pH 5 with dilute hydrochloric acid, diluted with water and extracted with ether. The ether extract was dried, concentrated in vacuo and the oil residue was crystallized by the addition of ether. The product, 2-chloroacetamido-5-bromo-4'-methylbenzophenone α-oxime, crystallized from dioxane in the form of colorless prisms melting at 179–180°.

A solution of 3 g. of 2-chloroacetamido-5-bromo-4'-methylbenzophenone α-oxime in 25 ml. of boiling acetic anhydride was cooled to 75° and saturated with hydrogen chloride. The mixture was left at room temperature for 30 minutes, heated again for 2 hours at 75°, saturated again with hydrogen chloride and concentrated in vacuo. The residue was crystallized from a mixture of methylene chloride and petroleum ether forming yellow needles of 6 - bromo-2-chloromethyl-4-(p-tolyl)-quinazoline 3-oxide, melting at 162–164°.

20 g. of 6-bromo-2-chloromethyl-4-(p-tolyl)-quinazoline 3-oxide were added in portions at 0° to 150 ml. of a 50% solution of methylamine in methanol. The reaction mixture was stirred at room temperature for one hour, then cooled to 5° and filtered. The reaction product remaining on the filter, 7-bromo-2-methylamine-5-(p-tolyl)-3H-1,4-benzodiazepine 4-oxide, was recrystallized from ethanol forming yellow prisms melting at 255–256°.

A solution of 3 g. of 7-bromo-2-methylamine-5-(p-tolyl)-3H-1,4-benzodiazepine 4-oxide in a mixture of 16 ml. of pyridine and 16 ml. of acetic anhydride was left at room temperature for 16 hours. The precipitated starting material was filtered off and the mother liquors were concentrated in vacuo. The residue was crystallized by the addition of ether, petroleum ether and acetone. After recrystallization from a mixture of acetone and petroleum ether, the product, 7-bromo-2-(N-methylacetamido)-5-(p-tolyl)-3H-1,4-benzodiazepine 4-oxide, formed colorless needles melting at 209–210°.

3 ml. of 1 N hydrochloric acid were added at room temperature to a solution of 1.2 g. (3 mmols) of 7-bromo-2 - (N - methylacetamido) - 5 - (p-tolyl)-3H-1,4-benzodiazepine 4-oxide in 30 ml. of alcohol. The mixture was refluxed for one hour, partly concentrated in vacuo and diluted with ice water. The crystalline reaction product precipitated out, was filtered off and recrystallized from a mixture of methylene chloride and petroleum ether. The 7 - bromo-5-(p-tolyl)-3H-1,4-benzodiazepin-2(1H)-one 4-oxide formed colorless plates melting at 237–238°.

Example 24

To 500 g. of molten p-chloraniline heated to 120° were added with stirring 750 ml. of p-chlorobenzoyl chloride, causing a violent evolution of hydrogen chloride. The mixture then solidified and was molten by heating to 200°. At this temperature, 500 g. of anhydrous zinc chloride were introduced. The stirring was continued and the mixture was heated at 230–242° for 2 hours. It was then poured into one liter of 0.5 N hydrochloric acid. The precipitated solid was filtered off, pulverized, suspended in one liter of 0.5 N hydrochloric acid and refluxed for one hour. The mixture was then cooled. The resinous material was filtered off and dissolved in a mixture of 14 liters of acetic acid and 3 liters of concentrated hydrochloric acid. The solution was refluxed for 18 hours and concentrated in vacuo. The residue was dissolved in 4 liters of benzene and stirred with an excess of alkali. The precipitated sodium p-chlorobenzoate was filtered off and the benzene solution concentrated to obtain the crude product. The 2-amino - 5,4'-dichlorobenzophenone was crystallized from alcohol to obtain yellow needles melting at 118–119°.

A solution of 169 g. of 2-amino-5,4'-dichlorobenzophenone and 73 g. of hydroxylamine hydrochloride in 730 ml. of alcohol was refluxed for 16 hours. The solution was concentrated in vacuo. The residue was diluted with water and ether and neutralized with 40% sodium hydroxide. The ether layer was separated, dried with sodium sulfate and concentrated in vacuo. The residue was dissolved in 100 ml. of benzene and crystallized by the gradual addition of about 2 liters of petroleum ether. The crystalline mixture was cooled for 14 hours at 5°. The precipitated crude 2-amino-5,4' - dichlorobenzophenone oxime was dissolved in 900 ml. of boiling benzene and treated with charcoal. The hot mixture was filtered and the oxime was crystallized by the addition of 1,000 ml. of petroleum ether. After crystallization from a mixture of benzene and petroleum ether, the pure α-oxime was obtained in the form of colorless prisms, melting at 151–154°.

15 ml. of chloracetyl chloride were added over a period ½ hour to a 50° solution of 28 g. of 2-amino-5,4'-dichlorobenzophenone α-oxime in 250 ml. of glacial acetic acid. The mixture was left at room temperature for 14 hours and then concentrated in vacuo. The residue was dissolved in hot methylene chloride and washed with ice cold sodium hydroxide and water. The organic layer was separated, dried and concentrated in vacuo to about 300 ml. It was then diluted with 600 ml. of petroleum ether and cooled. The reaction product, 6-chloro-2-chloromethyl-4-(4 - chlorophenyl) - quinazoline 3 - oxide, crystallized in fine yellow needles melting at 163–164°.

27 g. of 6-chloro-2-chloromethyl-4-(4-chlorophenyl)-quinazoline 3-oxide were added in portions at 0° to 150 ml. of a 50% solution of methylamine in methanol. The reaction mixture was stirred at room temperature for 19 hours, then cooled to 5° for 6 hours and filtered. The reaction product remaining on the filter was recrystallized from ethanol to obtain yellow prisms of 7-chloro-2-methylamino-5-(4-chlorophenyl)-3H-1,4 - benzodiazepine 4-oxide melting at 254–255°.

40 ml. of acetic anhydride were added at room temperature to a solution of 6 g. of 7-chloro-2-methylamino-5-(4-chlorophenyl)-3H-1,4-benzodiazepine 4-oxide in 50 ml. of pyridine. After 15 hours, a small amount of starting material which had precipitated out was filtered off. The solution was then concentrated in vacuo to a small volume, diluted with methylene chloride and washed with ice cold dilute sodium hydroxide and acid. The methylene chloride solution was then dried, concentrated in vacuo and the residue crystallized from acetone. The product, 7-chloro-2-(N-methylacetamido)-5 - (4 - chlorophenyl)-3H-1,4-benzodiazepine 4-oxide, formed colorless plates melting at 191–192°.

4 ml. of 1 N hydrochloric acid were added at room temperature to a solution of 1.4 g. (4 mmols) of 7-chloro-2-(N-methylacetamido)-5 - (4 - chlorophenyl) - 3H - 1,4-benzodiazepine 4-oxide in 30 ml. of alcohol. The mixture was refluxed for one hour, partly concentrated in vacuo and diluted with ice water. The crystalline reaction product, 7-chloro-5-(4-chlorophenyl)-3H-1,4-benzodiazepin-2 (1H)-one 4-oxide, was filtered off and recrystallized from methanol in the form of colorless plates melting at 250–252°.

Example 25

A mixture of 22 g. (100 mmols) of 2-amino-5-methylbenzophenone, 21 g. (150 mmols) of glycine ethyl ester hydrochloride and 120 ml. of pyridine was refluxed. After one hour, 10 ml. of pyridine were distilled off. The reaction mixture was then refluxed for 15 hours, concentrated in vacuo to a syrup and diluted with ether and water. Part of the product crystallized out and was filtered off. The ether layer was separated, concentrated in vacuo and the residual crude oil was treated again with 21 g. of glycine ethyl ester hydrochloride for 20 hours in boiling pyridine. The mixture was worked up as described above to obtain additional reaction product. The combined product was treated with activated charcoal in boiling ethanol, concentrated and crystallized from acetone to obtain colorless prisms of 7-methyl-5-phenyl-3H-1,4-benzodiazepin-2(1H)-one, M.P. 209–210°.

Example 26

A mixture of 50 g. of 2-benzamido-3,5-dimethylbenzophenone, 170 ml. of glacial acetic acid, 215 ml. of concentrated sulfuric acid, and 115 ml. of water was refluxed for 4 hours, cooled, made alkaline with sodium hydroxide solution, diluted with ice and extracted with ether. The ether solution was dried and concentrated in vacuo. The residue, a yellow oil, solidified after two weeks and was then recrystallized from petroleum ether. The 2-amino-3,5-dimethylbenzophenone crystallized in heavy yellow plates melting at 68–70°.

A mixture of 39 g. of 2-amino-3,5-dimethylbenzophenone, 40 g. of glycine ethyl ester hydrochloride and 200 ml. of pyridine was refluxed. After 5 hours, 10 ml. of pyridine was distilled off and an additional 36 g. of glycine ethyl ester hydrochloride were added. The reaction mixture was then refluxed for 15 more hours, concentrated in vacuo and the residual crude oil was dissolved The ether layer was washed with water, separated, concentrated in vacuo and the residual crude oil was dissolved in ether and left to crystallize. The material was purified by treatment with charcoal and ethanol and crystallized from acetone to obtain 7,9-dimethyl-5-phenyl-3H-1,4-benzodiazepin-2(1H)-one, M.P. 210–211°.

Example 27

A solution of 60.2 g. of 2-acetamido-5-chlorobenzophenone, 600 ml. of alcohol and 600 ml. of concentrated of nitric acid was saturated with hydrogen chloride. The mixture was left at room temperature for one hour and then diluted with water and extracted with methylene chloride. The methylene chloride solution was washed with water, dried, and concentrated in vacuo. The residue was dissolved in ether and crystallized by the addition of petroleum ether to obtain colorless prisms of 2-acetamido-3,5-dichlorobenzophenone melting at 143–144°.

A mixture of 72 g. of 2-acetamido-3,5-dichlorobenzophenone, 600 ml. of alcohol and 600 ml. of concentrated hydrochloric acid was refluxed for 3 hours, then diluted with ice, made alkaline with dilute sodium hydroxide and extracted with ether. The ether solution was dried and concentrated. The product, 2-amino-3,5-dichlorobenzophenone, was crystallized from a mixture of ether and petroleum ether forming yellow prisms melting at 93–94°.

A mixture of 18.5 g. of 2-amino-3,5-dichlorobenzophenone, 14 g. of glycine ethyl ester hydrochloride and 150 ml. of pyridine was refluxed. After 3 hours, 20 ml. of pyridine were distilled off and 14 g. of glycine ethyl ester hydrochloride were added. The reaction mixture was refluxed for an additional 15 hours, concentrated in vacuo and then diluted with ether and water. The reaction product, 7,9-dichloro-5-phenyl-3H-1, 4-benzodiazepin-2(1H)-one, crystallized out, was filtered off and recrystallized from acetone, M.P. 207–208°.

*Example 28*

A mixture of 11 g. (41 mmols) of 2-amino-5,4'-dichlorobenzophenone, 8.3 g. (60 mmols) of glycine ethyl ester hydrochloride and 200 ml. of pyridine was refluxed. After 3 hours, 20 ml. of pyridine were distilled off and 8.3 g. of glycine ethyl ester hydrochloride were added. The reaction mixture was then refluxed for an additional 15 hours, concentrated in vacuo and diluted with ether and water. The reaction product, 7-chloro-5-(4-chlorophenyl)-3H-1,4-benzodiazepin-2(1H)-one, crystallized out, was filtered off, decolorized by treatment with activated charcoal in alcohol, and recrystallized from alcohol, M.P. 247–248°.

*Example 29*

A mixture of 11.6 g. (40 mmols) of 2-amino-5-bromo-4'-methylbenzophenone, 8.3 g. (60 mmols) of glycine ethyl ester hydrochloride and 200 ml. of pyridine was refluxed. After 5 hours, 10 ml. of pyridine were distilled off. The reaction mixture was refluxed for an additional 15 hours, concentrated in vacuo and then diluted with ether and water. Part of the product crystallized out and was filtered off. The ether layer was separated, concentrated in vacuo and the residual crude oil was treated again with 6.3 g. of glycine ethyl ester hydrochloride for 20 hours in 100 ml. of boiling pyridine. The mixture was worked up as described above to obtain additional reaction product. The product, 7-bromo-5-(p-tolyl)-3H-1,4-benzodiazepin-2(1H)-one, was decolorized by treatment with charcoal in boiling ethanol and crystallized from acetone, M.P. 239–240°.

*Example 30*

14 g. (65 mmols) of α-bromopropionyl bromide and an equivalent amount of 3 N sodium hydroxide were introduced in small portions into a stirred, cooled (10°) solution of 11.6 g. (50 mmols) of 2-amino-5-chlorobenzophenone in 200 ml. of dioxane. The α-bromopropionyl bromide and sodium hydroxide were introduced alternately at such a rate so as to keep the temperature below 10° and the mixture neutral or slightly alkaline. The reaction was completed after 30 minutes. The final pH of the solution was neutral. The mixture was diluted with ice and water, then extracted with methylene chloride. The extract was washed with water, dried and concentrated in vacuo. The gummy residue was crystallized from a mixture of ether-petroleum ether. The 2-(α-bromopropionamido)-5-chlorobenzophenone was recrystallized from ether-petroleum ether in the form of colorless needles, M.P., 114–115°.

3 g. of 2-(α-bromopropionamido)-5-chlorobenzophenone were dissolved in 100 ml. of methanolic ammonia at room temperature. After 4 days, the clear amber solution was concentrated to dryness in vacuo and the residue was partitioned between 100 ml. of ether and 100 ml. of water. Some reaction product was filtered off and two more crops were obtained from the ether solution on concentration. The product, 7-chloro-3-methyl-5-phenyl-1,4-benzodiazepin-2(1H)-one, was crystallized from a mixture of benzene and petroleum ether, M.P. 220–221°.

*Example 31*

A mixture of 23.15 g. (0.1 mol) of 2-amino-5-chlorobenzophenone, 23 g. (0.15 mol) of DL-α-alanine ethyl ester hydrochloride and 50 ml. of pyridine was heated. The pyridine was slowly distilled off while the temperature of the reaction mixture was maintained between 120–126° by the addition of fresh pyridine to the mixture at the same rate as it was distilled off. The distillation was continued for 4 hours, a total of 50 ml. of pyridine being collected. The reaction mixture was then concentrated in vacuo to a syrup and partitioned between 100 ml. of water and a mixture of 160 ml. of benzene and 40 ml. of diethyl ether. The extraction with water was repeated twice (80 ml. and 50 ml.). The benzene-ether solution was separated, dried over magnesium sulfate and concentrated in vacuo. The residual gum was dissolved in 150 ml. of ether from which the product, 7-chloro-3-methyl-5-phenyl-1,4-benzodiazepin-2(1H)-one, crystallized.

*Example 32*

1.08 g. (0.02 mol) of sodium methoxide were added to a solution of 5.4 g. (0.02 mol) of 7-chloro-5-phenyl-3H-1,4-benzodiazepin-2(1H)-one 4-oxide and 300 ml. of benzene. 100 ml. of benzene were distilled off in order to remove the liberated methanol, then 1.73 ml. (0.02 mol) of allyl bromide were added. The solution was refluxed for 2.5 hours, then washed with water, dried over sodium sulfate, filtered and concentrated in vacuo. The residue, 7-chloro-1-allyl-5-phenyl-3H-1,4-benzodiazepin-2(1H)-one 4-oxide, crystallized from a mixture of acetone and petroleum ether in colorless plates, M.P. 150–151°.

*Example 33*

A mixture of 3 g. (0.01 mol) of 7-chloro-1-methyl-5-phenyl-3H-1,4-benzodiazepin-2(1H)-one 4-oxide, 30 ml. of chloroform and 1 ml. of phosphorus trichloride was refluxed for one hour. The reaction mixture was then poured on ice and stirred with an excess of 40% sodium hydroxide solution. The chloroform was then separated, dried with sodium sulfate, filtered and concentrated in vacuo. The residue was dissolved in methylene chloride and crystallized by the addition of petroleum ether. The product, 7-chloro-1-methyl-5-phenyl-3H-1,4-benzodiazepin-2(1H)-one, was recrystallized from a mixture of acetone and petroleum ether forming colorless plates melting at 125–126°.

*Example 34*

1.08 g. (0.02 mol) of sodium methoxide were added to a solution of 5.4 g. (0.02 mol) of 7-chloro-5-phenyl-3H-1,4-benzodiazepin-2(1H)-one in 300 ml. of benzene. 100 ml. of benzene were distilled off in order to remove the liberated methanol, then 1.9 ml. (0.02 mol) of dimethylsulfate were added. The solution was refluxed for one hour, then washed with water, dried over sodium sulfate, filtered and concentrated in vacuo. The residue, 7-chloro-1-methyl-5-phenyl-3H-1,4-benzodiazepin-2(1H)-one, was crystallized from a mixture of ether and petroleum ether, M.P. 125–126°.

*Example 35*

To a stirred suspension of 6 g. (22 m mols) of 7-chloro-5-phenyl-3H-1,4-benzodiazepin-2(1H)-one in 110 ml. of methanol was added in portions an excess of a solution of diazomethane in ether. After 1.5 hours stirring, the reaction mixture was concentrated in vacuo and the residue crystallized from a mixture of ether and petroleum ether. First 2 g. of starting material were recovered, then the crystalline product, 7-chloro-1-methyl-5-phenyl-3H-1,4-benzodiazepin-2(1H)-one, was obtained from the mother liquor, M.P. 125–126°.

*Example 36*

To a stirred suspension of 58 g. (0.25 mol) of 2-dimethylformamidinoanthranilic acid hydrochloride in 750 cc. of chlorobenzene was added in portions 60 g. of phosphorus pentachloride. The mixture was heated on the steam bath for 2 hours and cooled in ice to 10°. 135 g. of aluminum chloride was added in 4 portions, keeping the temperature of the reaction mixture below 10°. After completion of the addition of the aluminum chloride, the mixture was heated on the steam bath for 3 hours at 95°.

The reaction mixture was cooled in ice and 400 g. of crushed ice was added in portions, keeping the temperature below 40°. Next, 500 cc. of 40% sodium hydroxide was added dropwise, again keeping the temperature of the reaction mixture below 40°. The pH at this point was about 11. Heating on the steam bath at 95° for 4 hours followed, then cooling to 40°. The mixture was transferred to a separatory funnel and the chlorobenzene phase was separated. The aqueous phase was extracted with three 100 cc. portions of chlorobenzene and the combined chlorobenzene phases were concentrated in vacuo on the steam bath, yielding an oily residue. The oil was refluxed with stirring in a mixture of 150 cc. of ethanol, 75 cc. of water and 75 cc. of 10% sodium hydroxide for 24 hours. The solvents were distilled off at atmospheric pressure, the mixture was cooled and 500 cc. of water was added dropwise with stirring. After standing in the refrigerator overnight, the solid yellow product, 2-amino-4'-chlorobenzophenone, was filtered off, sucked dry, dried in vacuo at room temperature over sodium hydroxide, then crystallized from 200 cc. of hot ethanol in the form of yellow needles, M.P. 98–99°.

A stirred mixture of 15.5 g. (0.067 mol) of 2-amino-4'-chlorobenzophenone, 35 cc. of pyridine and 15 g. (0.1 mol) of glycine ethyl ester hydrochloride was slowly distilled at 115–120°, with the pyridine being replaced dropwise to keep the volume unchanged. After 5 hours, the reaction mixture was concentrated to dryness in vacuo. The residue was heated on the steam bath with 50 cc. of benzene and 50 cc. of water. The extract was decanted and the residue was re-extracted with 50 cc. of benzene and 50 cc. of water. The insoluble brown precipitate was filtered off and sucked dry. The crude product, 5-(p-chlorophenyl)-3H-1,4-benzodiazepin-2(1H)-one, was recrystallized twice from ethanol to obtain white plates melting at 262–263°.

The 2-dimethyl formamidinoanthranilic acid hydrochloride used as a starting material in this example is not a part of the present invention, but the preparation thereof is disclosed below in order that the present disclosure may be complete.

137 g. (1 mol) of anthranilic acid was dissolved in 250 cc. dimethylformamide. The solution was cooled to 0° and 85 cc. (155 g.=1.3 mols) of thionyl chloride was added dropwise, keeping the temperature of the reaction mixture below 40°. After allowing the mixture to cool to room temperature, 750 cc. of acetone was added. It was then cooled to 0°. The white 2-dimethylformamidinoanthranilic acid hydrochloride which separated was filtered off, washed with 300 cc. of cold acetone and sucked dry.

Example 37

A mixture of 22.5 g. of 2-amino-4,5-dimethylbenzophenone (0.1 mol), 21 g. of glycine ethyl ester hydrochloride (0.15 mol) and 300 ml. of pyridine was refluxed. After one hour 20 ml. of pyridine were distilled off and an additional 21 g. (0.15 mol) of glycine ethyl ester hydrochloride were added. The reaction mixture was then refluxed for 15 hours, concentrated partly at atmospheric pressure and then in vacuo. Ether and water were added to the residue and the crude, crystalline 7,8-dimethyl-5-phenyl-3H-1,4-benzodiazepin-2(1H)-one which precipitated was filtered off. After recrystallization from methanol, the product was obtained in the form of colorless prisms melting at 255–256°.

Example 38

A mixture of 27.6 g. of 2-amino-5-bromobenzophenone (0.1 mol), 21 g. of glycine ethyl ester hydrochloride (0.15 mol) and 300 ml. of pyridine was refluxed. After one hour, 21 ml. of pyridine were distilled off and then additional 21 g. (0.15 mol) of glycine ethyl ester hydrochloride were added. The reaction mixture was then refluxed for 15 hours, concentrated partly at atmospheric pressure and then in vacuo. Ether and water were added to the residue and the crude crystalline 7-bromo-5-phenyl-3H-1,4-benzodiazepin-2(1H)-one was filtered off. After recrystallization from acetone, the product formed colorless prisms melting at 220–221°.

Example 39

A solution of 75 g. of 2-acetamino-6-chlorobenzoic acid in 300 cc. of acetic anhydride was refluxed for 1 hr. The reaction mixture was then concentrated to dryness in vacuo and the residue crystallized from a mixture of benzene and hexane to give 5-chloro-2-methyl-4H-3,1-benzoxazine-4-one, which after recrystallization from benzene-hexane melted at 143.5–146°.

Example 40

A Grignard reagent prepared from 23.6 g. of brombenzene and 3.9 g. of magnesium in 400 cc. of ether was slowly added to an ice cold suspension of 29.3 g. of 5-chloro-2-methyl-4H-3,1-benzoxazine-4-one in 450 cc. of benzene and 150 cc. of ether. The brown suspension gradually turned to a tan-yellow. The reaction was stirred for 1 hr. in an ice bath after the addition of the Grignard reagent was completed and then stirred for 1 hr. at room temperature. After chilling to 0° in an ice-salt bath, the magnesium complex was decomposed by the careful addition of 250 cc. of 2 N hydrochloric acid. A white solid which proved to be N-acetyl-6-chloroanthranilic acid crystallized and was filtered off. The organic layer was separated and washed successively with water, dilute sodium hydroxide, and water, then dried over sodium sulfate and the solvent removed by distillation in vacuo. The residual oil of crude 2-acetamino-6-chlorobenzophenone was hydrolyzed by refluxing for 3 hrs. in 500 cc. of ethanol and 250 cc. of 6 N hydrochloric acid. After concentration to dryness in vacuo, the white crystalline residue was slurried with water, made alkaline with ammonia and extracted with benzene. An orange solid was obtained on evaporation of the benzene. Crystallization from hexane gave 2-amino-6-chlorobenzophenone, M.P. 101–102.5°.

Example 41

A solution of 10.6 g. of 2-amino-6-chlorobenzophenone in 400 cc. of ether was cooled in an ice bath and stirred with 100 cc. of water. While keeping the temperature at 0–5°, 9.25 g. of bromoacetylbromide was slowly added and the mixture was kept slightly alkaline by the simultaneous addition of 1 N sodium hydroxide. Stirring was continued for 15 min. after the reaction was complete. The reaction mixture was then diluted with 250 cc. of benzene, the organic layer was separated and washed with water. Solvent was evaporated in vacuo after drying over sodium sulfate leaving 15.5 g. of a viscous orange residue. Crystallization from a mixture of ethyl acetate and hexane gave 2-bromacetamino-6-chlorobenzophenone, M.P. 97–98°.

Example 42

A solution of 8.8 g. of 2-amino-6-chlorobenzophenone and 8.0 g. of glycine ethyl ester hydrochloride in 90 cc. of pyridine was refluxed for 1 hr. About 10 cc. of pyridine was refluxed for 1 hr. About 10 cc. of pyridine was distilled off and 8.0 g. of glycine ethyl ester hydrochloride and 10 cc. of pyridine added. Refluxing was continued for a total of 11 hrs. Pyridine was distilled off in vacuo and the residue partitioned between water and benzene. Solid material suspended between the two phases was filtered off and dried. Recrystallization from a mixture of ethyl acetate and hexane gave 6-chloro-5-phenyl - 3H - 1,4 - benzodiazepin - 2(1H) - one, M.P. 243.5–245°.

Example 43

2.8 g. of crude 2-bromacetamino-6-chlorobenzophenone was dissolved in 125 cc. of 16% (w./v.) ammonia in methanol and kept 18 hrs. at room temperature. The reaction mixture was then concentrated to dryness in vacuo and the residue partitioned between water and benzene. The organic layer was dried over sodium sulfate and the solvent then evaporated in vacuo leaving a residue of 1 g. The crude product was dissolved in 25 cc. of 1:1 benzene-hexane and passed through a column of 15 g. of Woelm alumina, grade I neutral. The product was eluted from the column with 95% benzene, 5% ethanol and crystallized from benzene giving 6-chloro-5 - phenyl - 3H - 1,4 - benzodiazepin - 2(1H) - one. After recrystallization from ethyl acetate the melting point was taken and found to be 244–245°.

Example 44

75 g. of 2-carboxy-6-chloracetanilide in 300 cc. of acetic anhydride was refluxed for 2 hrs. After concentration to dryness in vacuo, the residue was crystallized from benzene-hexane to give 8-chloro-2-methyl-4H-3,1-benzoxazine-4-one, M.P. 131.5–132.5°.

Example 45

A Grignard reagent prepared from 23.6 g. of brombenzene and 3.9 g. of magnesium in 400 cc. of ether was slowly added to a solution of 29.3 g. of 8-chloro-2-methyl-4H-3,1-benzoxazine-4-one in 450 cc. of benzene and 150 cc. of ether keeping the temperature at 0–5° during the addition. The reaction mixture was stirred for an additional hour in an ice bath and then for 1 hr. at room temperature. After chilling to 0° in an ice-salt bath, the complex was decomposed by the slow addition of 250 cc. of cold 2 N hydrochloric acid. A white solid separated and was filtered off. The product (14.1 g.) melted at 158–159°. Several crystallizations increased the melting point to 189–190°. The infrared spectrum of this material is identical with that of 2-acetamino-3-chlorobenzoic acid. The organic layer was separated and washed successively with water, dilute sodium hydroxide and water, then dried over sodium sulfate. Following concentration to dryness, the residue was crystallized and recrystallized from methylene chloride-hexane to give 2-acetamino-3-chlorobenzophenone, M.P. 129–131°.

Example 46

A solution of 9.5 g. of 2-acetamino-3-chlorobenzophenone in 260 cc. of ethanol and 125 cc. of 6 N hydrochloric acid was refluxed for 7 hrs. The residue obtained after removal of solvent by distillation in vacuo, was stirred with dilute ammonia and extracted with benzene. The benzene layer was dried over sodium sulfate and concentrated to dryness in vacuo leaving 9.3 g. of an orange residue. Crystallization from hexane gave 2-amino-3-chlorobenzophenone, M.P. 56.5–58°.

Example 47

To a solution of 2.0 g. of 2-amino-3-chlorobenzophenone in 100 cc. of benzene, 2.6 g. of bromacetyl bromide was added and the reaction heated to reflux for 2 hours. The original yellow color of the solution disappeared and hydrobromic acid was evolved. After cooling, the benzene solution was washed with cold dilute sodium hydroxide and water, then dried and concentrated in dryness in vacuo. The residue was crystallized from benzene-hexane to give 2-bromacetamido-3-chlorobenzophenone, M.P. 129–130°.

Example 48

A solution of 5.0 g. of 2-amino-3-chlorobenzophenone and 8.8 g. of glycine ethyl ester hydrochloride in 60 cc. of pyridine containing 3 drops of piperidine was heated to reflux for 24 hours. Solvent was distilled off in vacuo and the residue partitioned between benzene and water. The benzene layer was dried over sodium sulfate and concentrated to dryness in vacuo. The residue crystallized from benzene-hexane to give 9-chloro-5-phenyl-3H-1,4-benzodiazepin-2(1H)-one which, upon recrystallization from benzene-hexane melted at 174.5–176.5°.

Example 49

A solution of 2.0 g. of 2-bromacetamido-3-chlorobenzophenone in 75 cc. of 20% (w./v.) ammonia in methanol was kept at room temperature for 16 hours. The residue, after evaporation to dryness in vacuo, was partitioned between benzene and water. The benzene layer was washed with water, dried over sodium sulfate, and concentrated to dryness in vacuo. The residue was crystallized twice from benzene-hexane to give 9-chloro-5-phenyl - 3H - 1,4 - benzodiazepin-2(1H)-one, M.P. 174–176.5°.

Example 50

A solution of 100 g. of 4-chloro-anthranilic acid in 500 ml. of acetic anhydride was refluxed for 30 minutes; then, about 300 ml. of a mixture of acetic acid and acetic anhydride was distilled off at normal pressure and the solid residue was dissolved in 500 ml. of warm benzene. The solution was concentrated to about 200 ml. and treated while still warm with 250 ml. of petroleum ether (60–70°). After standing for a few hours at 0°, the precipitated product 2-methyl-7-chloro-4H-3,1-benzoxazin-4-one was collected on a funnel, washed 3 times with 200 ml. of hexane and dried for 2 hours in vacuo at 65° C.

Example 51

First, a solution of phenyl magnesium bromide was prepared using 12.35 g. of magnesium, 76.0 g. of freshly distilled bromobenzene and 250 ml. of anhydrous ether. This was added while stirring and cooling in an ice bath over a period of one hour to a solution of 94.15 g. of 2-methyl-7-chloro-4H-3,1-benzoxazin-4-one. The resulting reaction mixture was stirred for one hour at room temperature and then poured onto a mixture of 112 g. of ammonium chloride and 900 g. of crushed ice. The mixture was left for about half an hour and stirred occasionally. Then the reaction product was extracted with 3 portions of 500 ml. of benzene each. After washing the benzene layers thoroughly with water and after drying over sodium sulfate, the solvent was distilled off in vacuo at 65° to give a solid residue. This was directly hydrolyzed by refluxing for one hour in 500 ml. of methanol and 500 ml. of 3 N sodium hydroxide solution. After cooling, the reaction mixture was extracted in 3 separatory funnels with a total of 2 l. of benzene. After washing the benzene extract with water and after drying over sodium sulfate, the solvent was distilled off in vacuo at 65° C. to give a brown oil. This was dissolved in petroleum ether (60–70°) and purified by chromatography on 580 g. of alumina ("Woelm" neutral; grade II). Petroleum ether was used as an eluant. The first 4 fractions (600 ml.) contained the 2-amino-4-chloro-benzophenone, which was crystallized from hexane at 0° as light yellow needles and melted at 84–85°.

Example 52

A solution of 11.5 g. of 2-amino-4-chloro-benzophenone and 10.5 g. of glycine ethyl ester hydrochloride in 25 ml. of pyridine was stirred and heated to reflux for 2 hours. An additional 4.0 g. of glycine ethyl ether hydrochloride in 25 ml. of pyridine was added and 25 ml. of solvent was allowed to distill off. The resulting dark reaction mixture was refluxed for an additional 2 hours and then diluted with water. Extraction with benzene gave, after washing 3 times with water, a solid product, melting at 211–213°, which separated from the benzene solution and was filtered off. Evaporation of the filtrate and crystallization of the residue from about 45 ml. of ethanol at 0° gave a second crop with the same melting point. Recrystallization from acetone gave the pure 8-chloro-5-phenyl-3H-1,4-benzodiazepine-2(1H)-one, melting at 214–215° C. and forming gray, hexagonal prisms.

Example 53 o-Chlorobenzoylchloride (600 g.) was heated to 110° in a 5 l. three-necked flask equipped with thermometer, mechanical stirrer, and reflux condenser. To this p-chloroanilin (175 g.) was added under stirring. The mixture was then heated to 180° and zinc chloride (230 g.) was added. The temperature now was gradually raised to 220–230° and kept there until the HCl evolution had ceased (1–2 hours). After cooling to 120°, water was cautiously added and the mixture heated to reflux. The hot water layer was decanted and this procedure repeated 2 or 3 times.

The water insoluble brown mass was finally suspended in a mixture of 350 ml. water, 500 ml. acetic acid and 650 ml. conc. sulfuric acid and heated to reflux for 17 hours. After cooling, the homogeneous dark solution was poured into ice water, the mixture extracted with ether, the ether extract was neutralized with 2 N NaOH. Conc. of the ether solution and addition of a small amount of petroleum ether yielded 2-amino-2′,5-dichlorobenzophenone in yellow crystals, which after recrystallization from ether petroleum ether yielded the pure compound, M.P. 88–89°.

Example 54

2-amino-2′,5-dichlorobenzophenone (112 g.) was dissolved in a solution containing glycine ethyl ester hydrochloride (180 g.) in pyridine (500 ml.) and piperidine (5 ml.). After refluxing for 18 hours, the solvents were evaporated, the residue taken up in ether and the ether extract washed with water. The ether phase was repeatedly extracted with 2 N HCl thus separating the salt of the reaction product from the unreacted ketone which remains in the ether. The acidic aqueous solution was neutralized and extracted with ether to yield 7-chloro-5-(2 - chlorophenyl) - 3H - 1,4 - benzodiazepin - 2(1H)-one. After recrystallization from methanol the product forms crystals melting at 199–201°.

Example 55

2 - (2 - amino - acetamido) - 2′,5 - dichlorobenzophenone (1.2 g.) was refluxed in pyridine (50 ml.) for 17 hours. After evaporation of the pyridine in vacuo, the residue was treated with ether and water. The ether extract was washed, concentrated and the residue crystallized from methanol. Crystals of 7-chloro-5-(2-chlorophenyl) - 3H - 1,4 - benzodiazepin - 2(1H) - one were obtained, M.P. 199–201°.

The 2 - (2 - aminoacetamido) - 2′,5 - dichlorobenzophenone used as a starting material in this example is not a part of the present invention, but the preparation thereof is disclosed below in order that the present disclosure may be complete. 2 - amino - 2′,5 - dichlorobenzophenone (100 g.) was treated with bromoacetyl bromide (100 g.) in 500 ml. benzene. After a few hours the reaction mixture was washed with NaHCO₃ solution and water. Crystals which had separated from the benzene solution were filtered off; an additional crop was collected after concentrating the mother liquor. Crystals of 2 - (2 - bromoacetamido) - 2′,5 - dichlorobenzophenone were obtained which after recrystallization from benzene melted at 136°.

2 - (2 - bromoacetamido) - 2′,5 - dichlorobenzophenone (4.2 g.) was dissolved in tetrahydrofuran (75 ml.) in a three-necked flask equipped with stirrer, gas inlet tube and Dry Ice condenser. Liquid ammonia was added and refluxed for several hours. The solution was stirred overnight and the excess of NH₃ allowed to evaporate. THF and NH₃ was removed in vacuo and the residue treated with water, causing the precipitation of crystals of 2-(2-aminoacetamido)-2′,5-dichlorobenzophenone which after recrystallization from methanol melted at 122–124°.

Example 56

7 - chloro - 5 - (2 - chlorophenyl) - 3H-1,4-benzodiazepin - 2(1H)- one (15.2 g.) was dissolved in methanol (250 ml.) and a 1 N solution of sodium methoxylate (50 ml.) added. The solvent was removed in vacuo; the residue dissolved in dimethylformamide (50 ml.) and methyliodide (10 ml.) added. In a spontaneous reaction the temperature of the solution rose to 50°. After 30 minutes the main amount of the solvent was evaporated in vacuo, the residue poured into water and extracted with ether. From this ether solution crystals were isolated which after recrystallization from methanol yielded 1 - methyl - 7 - chloro - 5 - (2 - chlorophenyl) - 3H-1,4-benzodiazepin-2(1H)-one, M.P. 135–138°.

Example 57

5 g. of 7 - chloro - 5 - (2 - chlorophenyl) - 3H - 1,4-benzodiazepin-2(1H)-one (5 g.) suspended in acetic acid (75 ml.) was hydrogenated at room temperature and atmospheric pressure in the presence of PtO₂ (0.5 g.). After a rapid uptake of 600 ml. hydrogen, the hydrogenation was interrupted. Acetic acid (75 ml.) was added and the mixture was filtered. On concentration of the filtrate, crystals of 7 - chloro - 4,5 - dihydro - 5(2 - chlorophenyl) - 3H - 1,4 - benzodiazepin - 2(1H)-one were precipitated which after recrystallization from dilute acetic acid melted at 235–237°.

Example 58

7 - chloro - 5 - (2 - chlorophenyl) - 2 - methylamino-3H-1,4-benzodiazepine-4-oxide (5 g.) was dissolved in alcohol (50 ml.) and 37 ml. NaOH (1 N) added. The clear solution was kept standing overnight, the main amount of alcohol was removed in vacuo and the solution was extracted with ether and CH₂Cl₂. The water phase was acidified with HCl and extracted with ether and CH₂Cl₂. The organic phase yielded on evaporation crystals of 7 - chloro - 5 - (2 - chlorophenyl)-3H-1,4-benzodiazepine-2(1H)-one-4-oxide which after recrystallization from benzene-ether melted at 248–249° (dec.).

The 7 - chloro - 5 - (2 - chlorophenyl)-2-methylamino-3H-1,4-benzodiazepine-4-oxide used as a starting material in this example is not a part of the present invention, but the preparation thereof is disclosed below in order that the present disclosure may be complete.

2 - amino - 2′,5 - dichlorobenzophenone (171 g.) and hydroxylamine hydrochloride (134 g.), was dissolved in a mixture of pyridine (500 ml.) and piperidine (5 ml.) which was refluxed for 16 hours. The solvent was removed in vacuo, and the residue treated with water and ether. The ether solution was repeatedly extracted with 2 N HCl. The acidic aqueous phase was neutralized and extracted with ether. After drying and concentrating the ether solution, crystals were obtained on addition of petroleum ether. Recrystallization from a mixture of benzene and petroleum ether gave crystals of 2-amino-2′,5-dichlorobenzophenone oxime, which melted at 137–139°.

2-amino-2′,5-dichlorobenzophenone oxime (22 g.) was dissolved in acetic acid (100 ml.) and chloroacetylchloride (22.5 g.) added. The mixture was kept on the steam bath for 5 hours during which time a slow stream of HCl was passed into the flask. After concentrating the solution, crystals separated on cooling and were filtered off. The crystals were treated with an ice cold NaCO₃ solution and a mixture of CH₂Cl₂ and ether. The organic phase after washing with water and concentrating gave crystals of 6-chloro-2-chloromethyl-4-(2-chlorophenyl)-quinazoline-3-oxide which after recrystallization from CH₂Cl₂-petroleum ether had a M.P. of 140–143°.

6-chloro - 2 - chloromethyl-4-(2-chlorophenyl)quinazoline-3-oxide (4 g.) was dissolved on 60 ml. of a solution of CH₃NH₂ in methanol (6 N) and kept at room temperature overnight. The residue after evaporation of the solvent was taken up in CH₂Cl₂, the solvent washed with water. Crystals of 7-chloro-5-(2-chlorophenyl)-2-methylamino-3H-1,4-benzodiazepine - 4 - oxide were obtained with a M.P. 247–248° (dec.).

Example 59 o-Toluylchloride (100 g.) was heated to 100° in a three-necked flask equipped with thermometer, condenser, and mechanical stirrer. p-Chloroaniline (38 g.) was added and the mixture heated to 180° at which temperature ZnCl₂ (54 g.) was added. The temperature was now raised to 230° in the course of 1 hour and kept there for 1 hr. After cooling to 120°, water was cautiously added and the mixture heated to reflux. The hot water layer was decanted and the procedure repeated 5 times. The water insoluble material was refluxed for 17 hours with a mixture of 350 ml. 48% HBr and 350 ml. acetic acid. The dark solution was cooled and poured onto water. Extraction with ether, washing the ether with 2 N NaOH, and evaporating the solvent yielded a dark brown solution which was distilled at 0.2 mm. Between 150–160° a yellow viscous oil was collected. A sample was purified by gas chromatography and on scratching gave crystals of 2-amino-5-chloro-2'-methylbenzophenone which after recrystallization from heptane melted at 50–55°.

Example 60

2-amino-5-chloro-2'-methylbenzophenone (9 g.) was refluxed in a mixture of pyridine (50 ml.), glycine ethyl ester hydrochloride (40 g.), and piperidine (1 ml.) for 19 hours. The solvent was removed in vacuo and the residue treated with water and ether. The ether extract was washed with water and finally extracted with 3 N HCl. From the ether unreacted ketone could be recovered, whereas the acidic extract after neutralizing gave 7-chloro-5-o-tolyl - 3H - 1,4 - benzodiazepine-2(1H)-one which was extracted by ether. Recrystallized from ether the M.P. was 180–181°.

Example 61

7-chloro-5-o-tolyl-3H-1,4-benzodiazepin-2(1H)-one (4 g.) was dissolved in methanol (50 ml.) and a n/1 solution of sodium methoxylate in methanol (16 ml.) was added. The solvent was evaporated in vacuo and the residue dissolved in dimethylformamide (25 ml.). Methyl iodide (4 ml.) was added whereby an exothermic reaction took place (temperature ca. 50°). After 30 minutes the solvent was removed in vacuo and the residue treated with water and ether-CH₂Cl₂. From the organic phase crystals of 1-methyl-7-chloro-5-o-tolyl-3H-1,4-benzodiazepin-2(1H)-one were isolated which after recrystallization from methanol had M.P. 137–139°.

Example 62

A mixture of 176 g. (1.125 m.) of ortho-fluoro benzoyl chloride and 64 g. (0.5 m.) of para-chloroaniline was stirred and heated to 180° C., at which temperature 87 g. (0.64 m.) of zinc chloride was introduced, the temperature raised to 200–205° C. and maintained there for forty minutes. The golden colored melt was quenched by the careful addition of 500 ml. of 3 N hydrochloric acid and the resulting mixture refluxed for five minutes. The acid solution was decanted and the process repeated three times to remove all ortho-fluorobenzoic acid. The grey granular residue was dissolved in 300 ml. of 75% (vol./vol.) sulphuric acid and refluxed for forty minutes to complete hydrolysis. The hot solution was poured over 1 kg. of ice and diluted to two liters with water. The organic material was extracted with four 300 ml. portions of methylene chloride which were subsequently washed with two 500 ml. portions of 3 N hydrochloric acid to remove traces of para-chloroaniline, three 500 ml. portions of 5 N sodium hydroxide solution to remove ortho-fluorobenzoic acid, and finally two 200 ml. portions of saturated brine solution. The methylene chloride extract was dried over anhydrous sodium sulphate and the solvent removed to give the crude aminobenzophenone. Recrystallization from methanol gave 2-amino-5-chloro-2'-fluorobenzophenone yellow needles (M.P. 94–95° C.).

Example 63

A mixture of 88 g. (0.556 m.) of m-fluorobenzoyl chloride, 32 g. (0.25 m.) of p-chloroaniline and 44 g. (0.324 m.) of zinc chloride was treated as in Example 62 to yield of 2-amino-5-chloro-3'-fluorobenzophenone, yellow needles, M.P. 90–91° C.

Example 64

The procedure used in this preparation was essentially that used in Examples 62 and 63. Reaction times and temperatures were varied as were hydrolysis conditions.

To a mixture of 580 g. (3.35 m.) of o-fluorobenzoyl chloride and 265 g. (1.54 m.) of p-bromoaniline at 180° C., 262 g. (1.93 m.) of zinc chloride was added with stirring. The temperature was raised to 195–205° C. and maintained there for two hours. The reaction mixture was quenched and washed with acid as in the previous experiments, and the residue was hydrolyzed for twenty hours with 1 liter of 60% (v./v.) sulphuric acid. The product, 2-amino - 5 - bromo-2'-fluorobenzophenone, was extracted as before, yielding yellow needles, M.P. 101–2° C.

Example 65

A solution of 36 ml. (0.408 m.) of bromoacetyl bromide in 75 ml. of ether was added to an ethereal solution of 68 g. (0.272 m.) of 2-amino-5-chloro-2'-fluorobenzophenone and shaken. The resultant mixture was concentrated to a small volume and the white crystalline product was filtered, washed with water, and recrystallized from methanol to give 2-(bromoacetamido)-5-chloro-2'-fluorobenzophenone, M.P. 132.5–133° C., as fine white needles.

Example 66

A mixture of 20 g. (0.08 m.) of 2-amino-5-chloro-2'-fluorobenzophenone and 35 g. (0.25 m.) of glycine ethyl ester hydrochloride was refluxed in 200 ml. of pyridine, containing 0.5 ml. of piperidine, for eighteen hours. The mixture was distilled until 100 ml. of pyridine had been collected, and the residue poured into water. The remaining pyridine was neutralized with dilute hydrochloric acid and the product extracted with two 100 ml. portions of methylene chloride. The extracts were combined, washed well with water and saturated brine solution, dried over anhydrous sodium sulfate, and the solvent removed under reduced pressure. The oil remaining was dissolved in acetone, treated with charcoal (Norit), filtered and recrystallized from a mixture of acetone and hexane to give 7-chloro-5-(2-fluorophenyl)-3H-1,4-benzodiazepin-2(1H)-one as white needles, M.P. 205–206° C.

Example 67

A solution of 85 g. (0.229 m.) of 2-bromoacetamido-5-chloro-2'-fluorobenzophenone in 2 liters of methanol was added to 1.3 liters of a 15% (w./v.) solution of ammonia in methanol. The mixture was allowed to stand at room temperature for eighteen hours, the solvent removed in vacuo and the residue dissolved in methylene chloride. The methylene chloride solution was thoroughly extracted with water, dried over anhydrous sodium sulfate and concentrated to an oil which crystallized on the addition of a small amount of acetone. The product was recrystallized from acetone-hexane to give 7-chloro-5-(2-fluorophenyl) - 3H - 1,4 - benzodiazepin - 2(1H) - one as white needles, M.P. 205–6° C.

Example 68

A solution of 34.3 g. (0.0925 m.) of 2-bromoacetamido-5-chloro-2'-fluorobenzophenone in 250 ml. of tetrahydrofuran was poured into 300 ml. of liquid ammonia. The mixture was allowed to stand overnight and then poured into 2 liters of water. The product was extracted into methylene chloride and purified as in Example 67 to yield 7 - chloro - 5 - (2-fluorophenyl)-3H-1,4-benzodiazepin-2 (1H)-one, M.P. 205–6° C.

Example 69

7 - chloro - 5 - (2-fluorophenyl)-3H-1,4-benzodiazepin-2(1H)-one was obtained from 2-aminoacetamido-5- chloro-2-fluorobenzophenone by simply refluxing the compound for seventeen hours in any one of the following solvents: (a) pyridine, (b) toluene, (c) p-cymene. The product was obtained by removal of the solvent under vacuo and recrystallization of the residue from acetone-hexane, M.P. and mixed M.P. 205–206° C.

The 2-aminoacetamido-5-chloro-2'-fluorobenzophenone used as a starting material in this example is not a part of the present invention, but the preparation thereof is disclosed below in order that the present disclosure may be complete.

2 - (bromoacetamido)-5-chloro-2'-fluorobenzophenone (35 g., 0.093 m.) was suspended in 800 ml. of liquid ammonia and the ammonia allowed to evaporate over fifteen hours. The resultant mixture was ground thoroughly in a mortar with a pestle with water to remove ammonium bromide, and the product recrystallized from benzene-hexane to give white needles of 2-(aminoacetamido) - 5 - chloro - 2' - fluorobenzophenone, M.P. 115–115.5° C.

*Example 70*

By suspending 2-aminoacetamido-5-chloro-2'-fluorobenzophenone in a methanolic ammonia solution and stirring overnight, 7-chloro-5-(2-fluorophenyl)-3H-1,4-benzodiazepin-2(1H)-one is obtained by working up the reaction as in Example 67, M.P. and mixed M.P. 205–6° C.

*Example 71*

A mixture of 15.9 g. (0.0638 m.) of 2-amino-5-chloro-3'-fluorobenzophenone and 26.6 g. (0.192 m.) of glycine ethyl ester hydrochloride was refluxed in 100 ml. of pyridine containing 0.3 ml. of piperidine for sixteen hours. The reaction mixture was poured into 1 liter of water and extracted with methylene chloride. (3 x 200 ml.) The methylene chloride extracts were combined, washed three times with 100 ml. portions of 1.5 N hydrochloric acid or until all pyridine had been removed as the hydrochloride and finally two 100 ml. portions of saturated brine solution. The organic layer was dried over anhydrous sodium sulfate and the solvent removed. The residue was recrystallized from acetone to give 7-chloro-5-(3-fluorophenyl) - 3H - 1,4 - benzodiazepin - 2(1H) - one as white prisms, M.P. 200–201° C.

*Example 72*

A mixture of 8.5 g. (0.029 m.) of 2-amino-5-bromo-2'-fluorobenzophenone and 8.3 g. (0.06 m.) of glycine ethyl ester hydrochloride was refluxed in 75 ml. of pyridine containing 0.1 ml. of piperidine for seventeen hours. The reaction mixture was worked up as in Example 71 and the crude product was separated from unreacted aminobenzophenone by chromatography on grade III alumina (Woelm neutral alumina grade I mixed with 6% water was used for chromatography) using benzene as an eluent. Recrystallization of the fraction, M.P. 186–7° C., from acetone-petrol gave 7-bromo-5-(2-fluorophenyl) - 3H - 1,4 - benzodiazepin - 2(1H) - one as white needles, M.P. 187–188° C.

*Example 73*

50 g. (0.142 m.) of 2-aminoacetamido-5-bromo-2'-fluorobenzophenone was fused in an oil bath at a temperature of 180° C. The melt was maintained at this temperature until all evolution of water had ceased. Recrystallization of the reaction mixture from acetone afforded 7-bromo-5-(2-fluorophenyl)-3H-1,4-benzodiazepin-2(1H)-one as white prisms, M.P. and mixed M.P. 187–8° C.

The 2-aminoacetamido-5-bromo-2'-fluorobenzophenone used as a starting material in this example is not a part of the present invention, but the preparation thereof is disclosed below in order that the present disclosure may be complete.

An ethereal solution was prepared from 70 g. (0.246 m.) of 2-amino-5-bromo-2'-fluorobenzophenone and to this was added a solution containing 21.5 ml. (0.246 m.) of bromoacetyl bromide in 50 ml. ether. The insoluble hydrobromide that formed was decomposed by shaking the mixture with water. The water was separated and the solution concentrated. The precipitate was filtered and the filtrate was retreated twice more with portions of bromoacetyl bromide in ether solution as before. The combined precipitates were washed well with water and recrystallized from methanol to give 2-bromoacetamido-5-bromo-2'-fluorobenzophenone as white needles, M.P. 139–140° C.

2 - (bromoacetamido)-5-bromo-2'-fluorobenzophenone (60 g., 0.145 m.) was suspended in 1 liter of liquid ammonia and treated as was the bromoacetamido compound in Example 69 to give 2-aminoacetamido-5-bromo-2'-fluorobenzophenone as white needles, M.P. 110–111° C.

*Example 74*

The sodio-derivative of 7-chloro-5-(2-fluorophenyl)-3H-1,4-benzodiazepin-2(1H)-one was prepared by treating 16.5 g. (0.0608 m.) of the compound with one equivalent of a methanolic solution (75 cc.) of sodium methoxide and stirring for thirty minutes under reflux. The mixture was then concentrated to an oil which was dissolved in 50 ml. of N,N-dimethylformamide and reacted with 11.4 ml. (26 g., 0.1824 m.) of methyl iodide. The mixture was refluxed for thirty minutes and then poured into 1 liter of water. The oil which came out of solution was extracted with methylene chloride (3 x 100 ml.). The extracts were combined dried over anhydrous sodium sulfate, and the solvent removed under reduced pressure. The 16 g. of oil recovered represented a yield of 92.5% of crude material. The oil was distilled at 200–210° C. at 0.1 mm. by a bulb to bulb technique, and the pale yellow viscous oil obtained was chromatographed on grade III alumina. The fractions obtained using benzene as an eluent were discarded and the 7-chloro-1-methyl-5-(2-fluorophenyl)-3H-1,4-benzodiazepin-2-one was eluted with ether. It forms a viscous colorless oil.

*Example 75*

A solution of 16.6 g. (0.05 m.) of 7-bromo-5-(2-fluorophenyl) - 3H - 1,4-benzodiazepin-2(1H)-one in 50 ml. of methanol was refluxed for thirty minutes with one equivalent of sodium methoxide in methanol. The solvent was removed under reduced pressure and the residue dissolved in 150 ml. of N,N-dimethylformamide. The solution was cooled to 10° C. and 37 ml. (0.6 m.) of methyl iodide was added. The solution was stirred and heated under reflux on a steam bath for one hour then the excess of methyl iodide was distilled off. The residual dimethyl formamide solution was poured into 2 liters of water and the organic material was extracted into methylene chloride (3 x 200 ml.). The combined extracts were washed with water (2 x 200 ml.) and brine (2 x 200 ml.), dried over anhydrous sodium sulfate, and the solvent removed in vacuo. The crude material was recrystallized from ether yielding 7-bromo-1 - methyl - 5-(2-fluorophenyl)-3H-1,4-benzodiazepin-2-one as colorless needles, M.P. 132–132.5° C.

*Example 76*

A solution of 5.9 g. (0.0197 m.) of 7-chloro-5-(2-fluorophenyl) - 3H - 1,4-benzodiazepin-2(1H)-one in 60 ml. of glacial acetic acid was hydrogenated at room temperature and atmospheric pressure in the presence of 0.6 g. of platinum oxide until 0.0197 mole of hydrogen was absorbed. The mixture was then filtered, the solvent removed under reduced pressure and a crystalline product was obtained. Recrystallization from acetone gave 7 - chloro - 4,5-dihydro-5-(2-fluorophenyl)-3H-1,4-benzodiazepin - 2(1H)-one as white needles, M.P. 214–215° C.

Example 77

The hydrogenation of 7-bromo-5-(2-fluorophenyl)-3H-1,4-benzodiazepin-2(1H)-one 5 g. (0.0155 m.) in 25 ml. of glacial acetic acid using 0.600 g. of platinum oxide as catalyst was carried out as in Example 76 above. The theoretical uptake of one equivalent of hydrogen was completed in thirty minutes and the reaction worked up as described above to yield 7-bromo-4,5 - dihydro - 5-(2-fluorophenyl)-3H-1,4-benzodiazepin-2-one, which was obtained as white needles, M.P. 224–225° C., by recrystallization from methanol.

Example 78

A solution of 22.6 g. of 2-amino-4,5-dimethyl-2'-chlorobenzophenone and 24 g. glycine ethyl ether hydrochloride in 200 cc. pyridine was refluxed for 48 hours. The reaction mixture was concentrated first at atmospheric pressure then in vacuo to dryness, water was added and mixture extracted with ether. The ether extract was dried over sodium sulfate, concentrated in vacuo to dryness and the oily residue crystallized from ether yielding the crude reaction product which was purified by extracting impurities with acetone and recrystallization of the undissolved reaction product from dilute alcohol. The pure 7,8-dimethyl-5-(2-chlorophenyl)-3H-1,4-benzodiazepin-2(1H)-one forms colorless prisms melting at 259–260°.

Example 79

A solution of 16.2 g. of 7-chloro-5-phenyl-3H-1,4-benzodiazepin-2(1H)-one, 2.7 g. of paraformaldehyde and 0.1 g. of sodium hydroxide in 265 cc. 95% alcohol was refluxed for 8 hrs., concentrated in vacuo to a small volume. 100 cc. of water was added and 7.2 g. of crystalline starting material was filtered off. The filtrate was concentrated in vacuo to smaller volume and extracted with methylene chloride. The methylene chloride extract was dried over sodium sulfate and concentrated in vacuo. To the oily residue ether was added and the reaction product which crystallized out was filtered off, yielding crude 7-chloro-1-hydroxymethyl-5-phenyl - 3H-1,4-benzodiazepin-2(1H)-one. Upon recrystallization from a mixture of methanol, ether and petroleum ether the product forms colorless prisms melting at 201–202°.

Example 80

To a warm, stirred suspension of 28.6 g. (0.1 mole) of 7-chloro - 5 - phenyl-3H-1,4-benzodiazepin-2(1H)-one 4-oxide in 450 ml. of dry benzene were added 5.4 g. of sodium methoxide. The mixture was refluxed and part of the solvent was distilled off to remove the liberated methanol. To this clear solution were added 11.5 ml. of benzylchloride, 1 g. of sodium iodide and 200 ml. of acetonitrile. The mixture was refluxed for 15 hours, then concentrated in vacuo to a smaller volume and diluted with water. The benzene layer was separated, dried over sodium sulfate and filtered. The filtrate was concentrated in vacuo and the oily residue dissolved in a small amount of a mixture of equal parts (by volume) of methylene chloride and petroleum ether. This was adsorbed on a column (3.5 cm. diameter) prepared with 450 g. of aluminum oxide and the above mixture of solvents. The elution with 2 l. of the same solvent mixture removed impurities. The reaction product was eluted first with 2 l. of methylene chloride and then with 500 ml. of methylene chloride containing 10% methanol. The methylene chloride and methylene chloride-methanol eluates were combined and concentrated in vacuo to dryness. The residue was crystallized from a mixture of methylene chloride, ether and petroleum ether, yielding crude 1 - benzyl-7-chloro-5-phenyl-3H-1,4-benzodiazepin-2(1H)-one 4-oxide. The product forms colorless prisms melting at 151–152° C.

Example 81

A solution of 7.5 g. of 1-benzyl-7-chloro-5-phenyl-3H-1,4-benzodiazepin-2(1H)-one 4-oxide in 110 cc. of methanol was hydrogenated in the presence of 5 g. of wet Raney nickel at room temperature and atmospheric pressure. The uptake stopped after the absorption of 1 mole of hydrogen. The mixture was filtered, the solution concentrated in vacuo to small volume and crude crystalline reaction product was filtered off. Upon recrystallization from a mixture of methylene chloride, ether and petroleum ether the pure 1-benzyl-7-chloro-5-phenyl-3H-1,4-benzodiazepin - 2(1H) - one formed colorless prisms melting at 174–175°.

Example 82

To a suspension of 5.75 g. of 7-chloro-5-phenyl-3H-1,4-benzodiazepin-2(1H)-one 4-oxide in 150 cc. dry benzene were added 1.08 g. sodium methoxide. About 10 cc. of the solvent containing some methanol was distilled off. 2.34 cc. of ethyl bromide was then added and the mixture was refluxed for 20 hours. The reaction mixture was then diluted with ice water, the organic layer was separated, dried and concentrated in vacuo. The oily residue was crystallized from a mixture of methylene chloride and petroleum ether and yielded crude reaction product which upon recrystallization from a mixture of acetone and petroleum ether gave the pure 7-chloro-1-ethyl-5-phenyl-3H-1,4-benzodiazepin-2(1H)-one 4-oxide as colorless plates melting at 207–208°.

Example 83

A solution of 4 g. of 7-chloro-1-ethyl-5-phenyl-3H-1,4-benzodiazepin-2(1H)-one 4-oxide in 180 cc. of methanol was hydrogenated in the presence of 5 g. of wet Raney nickel at room temperature and atmospheric pressure. The uptake stopped after the absorption of 1 mole of hydrogen. The mixture was then filtered and the solution concentrated in vacuo to dryness. The oily residue was crystallized from acetone and yielded crude reaction product. The pure 7-chloro-1-ethyl-5-phenyl-3H-1,4-benzodiazepin - 2(1H) - one after crystallization from acetone forms colorless prisms melting at 127–128°.

Example 84

A solution of 23.15 g. (0.1 mole) of 2-amino-5-chlorobenzophenone and 32.4 g. (0.15 mole) of ethyl α-aminophenylacetate hydrochloride in 150 cc. of pyridine was refluxed for 22 hours, with occasional distillation of pyridine, the volume being kept constant by the addition of fresh pyridine. The pyridine was finally removed in vacuo and the residual oil was partitioned between ether and water. The insoluble product was then filtered off and washed with water and ether to give a yellow solid. This was then first extracted with acetone and the insoluble residue was crystallized from acetonitrile to give 7-chloro-3,5-diphenyl-3H-1,4-benzodiazepin - 2(1H)-one as flat colorless prisms melting at 269–270° C.

Example 85

A solution of 12.5 g. (0.06 mole) of L-tyrosine ethyl ester hydrochloride and 9.3 g. (0.04 mole) of 2-amino-5-chlorobenzophenone in 85 cc. of pyridine was refluxed for a total time of ca. 40 hours. At intervals some pyridine was distilled off, the volume being kept constant by additions of fresh pyridine. The final reaction mixture was concentrated in vacuo and the residue was partitioned between 150 cc. of ether and 50 cc. of water. The ether layer was further extracted with 50 cc. of water and then treated with 100 cc. of 1.5 N hydrochloric acid which resulted in the formation of an insoluble hydrochloride. This was filtered off and washed with ether and then treated with 5 N ammonium hydroxide solution. The liberated base was extracted with ether and the ether solution was washed with water and dried over sodium sulfate. On evaporation a solid was obtained. As this could not be crystallized the purification via the insoluble hydrochloride was repeated to give the base which slowly crystallized from a mixture of ether and petroleum ether. Three recrystallizations from benzene finally gave 7-chloro - 5 - phenyl-3-(4-hydroxybenzyl)-3H-1,4-benzodiazepin-2(1H)-one as colorless needles melting at 151–153°.

*Example 86*

A solution of a mixture of 231.5% g. (1 mole) of 2-amino-5-chlorobenzophenone and 231.5 g. (1.2 moles) of p-tolylsulfonyl chloride in one liter of pyridine was refluxed for 1½ hours. Then 0.5 l. of pyridine was distilled off, and the residue was poured into water and stirred until the reaction product solidified. The solid material was filtered off and dissolved in 600 ml. of boiling benzene and converted into the sodium salt by the careful addition of 150 ml. of a 40% solution of sodium hydroxide. The stirring and refluxing was continued for 1 hour while the sodium salt deposited as a solid mass which on further stirring became a cream-colored paste. The suspension was cooled to 25°, filtered, washed with five 200 ml. portions of hot benzene and then with three 200 ml. portions of water. The sodium salt of 2-(p-tolylsulfonamido)-5-chlorobenzophenone was dried in vacuo at 80° C. to give a cream-colored powder. After recrystallization from a mixture of dimethyl formamide and chloroform it forms yellowish needles melting at 298–299° C.

*Example 87*

Part of the sodium salt described above was dissolved in hot 0.2 N sodium hydroxide. The solution was cooled, filtered, and acidified with dilute hydrochloric acid. The precipitate was allowed to solidify, filtered off, washed with water, and recrystallized from ethanol to give needles of 2-(p-tolylsulfonamido)-5-chlorobenzophenone melting at 120–121°.

*Example 88*

A solution of 15.5 g. (0.0413 mole) of 2-(p-tosylamido)-5-chlorobenzophenone in 200 ml. of toluene was dried by distilling off 50 ml. of toluene. The solution was cooled to 65° and 11.5 ml. of a solution of 10 g. of sodium in 100 ml. of methanol was added. The clear yellow solution rapidly deposited the cream colored sodium salt. The methanol was distilled off and the reaction mixture was refluxed 1½ hours to ensure the complete formation of the sodium salt. About 10 ml. of toluene was distilled off at the end of the reflux period to remove any remaining methanol. To the reaction mixture 4.6 ml. (0.066 mole) of dimethyl sulfate was added and the stirring and refluxing was continued for 1 hour and 20 minutes. The excess dimethyl sulfate was destroyed by refluxing with 100 ml. of 3 N sodium hydroxide for 1½ hours. The mixture was cooled and the organic layer was separated, washed with water and concentrated in vacuo. The residue was crystallized from a mixture of benzene and petroleum ether to give the 2-(N-methyl-p-tolylsulfonamido) - 5 - chlorobenzophenone as colorless needles which after crystallization from ethanol, M.P. 151–152° C.

*Example 89*

To 200 ml. of 70% sulfuric acid heated to 105° C., 10 g. of 2-(N-methyl-p-tolylsulfonamido)-5-chlorobenzophenone were added. The heating was continued and the mixture was stirred until a clear solution resulted. This took about 8 minutes, the heating being stopped at 145° C. The clear solution was poured over 1 liter of crushed ice and diluted with water. The yellow reaction product was filtered off, washed thoroughly with water and dried. On recrystallization from methanol, yellow prisms (M.P. 93–94°) or needles melting at 95–96° of 2-methylamino-5-chlorobenzophenone are obtained.

*Example 90*

A suspension of 31.5 g. (76.8 mmoles) of the sodium salt of 2-tosylamino-5-chlorobenzophenone was refluxed in 300 ml. of anhydrous acetonitrile with 13.3 ml. (18.7 g.=155 mmoles) of allyl bromide for 1½ hours. The creamy voluminous sodium salt soon reacted and a fine white precipitate of sodium bromide was formed. This was filtered off and the colorless solution was concentrated in vacuo to give a colorless oil. A solution of 25 g. of this oil in 40 ml. of glacial acetic acid was added to 300 ml. of 70% sulfuric acid at 105° C. The mixture was stirred and heated to 145° C. within 8 minutes. The resulting dark, clear solution was poured over 2 l. of crushed ice and diluted with ca. 1 l. of water. The gummy solid was dissolved in 1.5 l. of ether and the ether layer was washed with 1 N sodium hydroxide and then with water. The ether solution was dried, concentrated in vacuo and the residue was crystallized from 75 ml. of methanol to give 2-allylamino-5-chlorobenzophenone as yellow needles which after crystallization from methanol melt at 76–77° C.

*Example 91*

A mixture of 61.2 g. (0.2 mole) of the sodium salt of 2-(p-tolylsulfonamido)-5-chlorobenzophenone, 30 ml. (0.24 mole) of benzyl chloride and 0.5 g. of sodium iodide was refluxed with stirring in 250 ml. of acetonitrile. After 4 hours, the yellow voluminous sodium salt had changed to a white fine precipitate of sodium chloride. The refluxing was continued for another hour and then the sodium chloride was filtered off and the solution was concentrated in vacuo. The residue was dissolved in ether and washed with water to remove any mineral salts. The ether solution was dried and partly concentrated yielding large colorless prisms. Crystallization from hexane-ether yields colorless prisms of 2-(N-benzyl-p-tolylsulfonamido)-5-chlorobenzophenone melting at 116–118° C.

*Example 92*

20 g. of the material obtained in Example 91 was added with stirring to 600 ml. of 70% sulfuric acid at 105° and the temperature was raised to 145° within 10 minutes. The reaction mixture was then poured over 1.5 l. of cracked ice and the gummy solid which was precipitated was taken up in ether. The ether solution was washed with sodium carbonate solution and water, dried over sodium sulfate and concentrated in vacuo to give a yellow oil. This was crystallized from ethanol to give 2-benzylamino - 5 - chlorobenzophenone. Recrystallization from ethanol gives yellow prisms melting at 86–87° C.

*Example 93*

A solution of 24.5 g. (0.1 mole) of 2-methylamino-5-chlorobenzophenone in 100 ml. of ether was mixed with 5.5 ml. (0.06 mole) of bromoacetyl bromide. The mixture was allowed to stand for 5 minutes and then washed with 100 ml. of water. After separating, the process was repeated with 2.20 ml. (0.025 mole) of bromoacetyl bromide and then with smaller portions until the yellow amine color had practically disappeared and further additions of acylating agent caused no perceptible change in color. A total of 0.18 mole of bromoacetyl bromide was used. The ether layer was dried and concentrated in vacuo. The oil was treated with water (to destroy unreacted bromoacetyl bromide) and hexane. The formed crystals were filtered off, washed with water, and then with hexane until colorless. The 2-(2-bromo-N-methylacetamido)-5-chlorobenzophenone obtained was crystallized from a mixture of ether and petroleum ether to yield colorless prisms melting at 95–96°.

*Example 94*

A solution of 5.0 g. of 2-(2-bromo-N-methylacetamido)-5-chlorobenzophenone in 22.5 ml. of methanol was added to 52.5 ml. of a 15% methanolic ammonia solution (wgt./vol.). This mixture was left for 45 minutes at room temperature, diluted with 75 ml. of methanol and left standing for an additional 2¼ hours. The mixture was then diluted with about 200 ml. of water and extracted with three 100 ml. portions of methylene chloride. The organic layer was washed free of ammonia, dried over sodium sulfate and allowed to stand at room temperature with charcoal for two hours. The solution was then concentrated in vacuo to an oil. The residue was crystallized from 25 ml. of ether yielding 7-chloro-1-methyl-5-phenyl-3H-1,4-benzodiazepin-2-(1H)-one; M.P. 125–126° (colorless plates).

*Example 95*

A solution of 6.5 g. (26.6 mmoles) of 2-methylamino-5-chlorobenzophenone and 10 g. (71.4 mmoles) of glycine ethyl ester hydrochloride in 70 ml. of pyridine was heated to reflux temperature. Some pyridine (10 ml.) was distilled off initially and the refluxing was continued for 16 hours. Then, while the volume was kept constant by the addition of fresh solvent, 60 ml. of pyridine was distilled off within 6 hours. The pyridine was then removed in vacuo and the residue was partitioned between 100 ml. each of water and ether. The ether layer was further washed with water and then dried and treated with charcoal. The resulting yellow solution was concentrated in vacuo to give an oil which on crystallization from methanol yielded some starting material. The mother liquor was concentrated in vacuo to an oil and crystallized from ether to give 7-chloro-1-methyl-5-phenyl-3H-1,4-benzodiazepin-2-(1H)-one melting at 125–126°.

*Example 96*

A solution of 3.07 g. (11.3 mmoles) of 2-allylamino-5-chlorobenzophenone in 100 ml. of ether was treated with 1.1 ml. (6 mmoles) of bromoacetyl bromide. The ether solution was then washed with 100 ml. of water. This process was repeated once with 0.5 ml. and then 3 times with 0.3 ml. of bromoacetyl bromide. The ether solution was finally washed with water until neutral, dried over sodium sulfate and concentrated to give colorless 2-2 - bromo - N - allylacetamido) - 5 - chlorobenzophenone which on recrystallization from hexane gave colorless flat prisms melting at 85–86° C.

*Example 97*

A solution of 3.2 g. of 2-(2-bromo-N-allylacetamido)-5-chlorobenzophenone in 25 ml. of methanol and 30 ml. of a 21% solution of ammonia in methanol was allowed to stand overnight at 25° C. The solution was concentrated in vacuo (water bath temperature 20–25° C.). To the residue 100 ml. of ether was added and the theoretical amount of ammonium bromide was filtered off. The ether solution was treated with charcoal for 1 hour, filtered, concentrated in vacuo, and the residue was crystallized from a mixture of ether and petroleum ether (1:9). This yielded 1-allyl-7-chloro-5-phenyl-3H-1,4-benzodiazepin-2-(1H)-one. Recrystallization from hexane gives colorless clusters of prisms melting at 105–106° C.

*Example 98*

A solution of 3.22 g. (10 mmoles) of 2-benzylamino-5-chlorobenzophenone in 100 ml. of ether was treated with 0.54 ml. (6 mmoles) of bromoacetyl bromide. After standing for 2–3 minutes, the ether solution was washed with 100 ml. of water. This procedure was repeated with first 0.36 ml. (4 mmoles) and then with three 0.18 ml. (2 mmoles) portions of bromoacetyl bromide. The ether solution was then washed thoroughly with water and a first crop melting at 159–160° crystallized out. A second crop was obtained on concentrating the ether solution. On recrystallization from chloroform-hexane mixture colorless prisms of 2-(2-bromo-N-benzylacetamido)-5-chlorobenzophenone melting at 159–160° C. are obtained.

*Exampe 99*

A solution of 2.27 g. (6.14 mmoles) of 2-(2-bromo-N-benzlacetamido)-5-chlorobenzophenone in 120 ml. of ether and 60 ml. of a 13% wt./vol. solution of ammonia in methanol was allowed to stand for 18 hours at room temperature. The resulting slightly yellow solution was concentrated in vacuo with a bath temperature below 25° C. The residue was partitioned between 100 ml. each of ether and water. The ether solution was dried over sodium sulfate and concentrated yielding almost colorless 1 - benzyl - 7-chloro-5-phenyl-3H-1,4-benzodiazepin-2 (1H)-one melting at 173–174° C.

*Example 100*

To a solution of 27.2 g. (0.07 mole) of 2-tosylamido-5-chlorobenzophenone in 300 cc. of toluene was added a solution of 2 g. (0.084 mole) of sodium in 20 cc. of methanol. The methanol was distilled off and the mixture was refluxed with stirring for 1–5 hours. After cooling, 21.8 g. (19.1 cc., 0.14 mole) of diethyl sulfate was added and refluxing with stirring was continued for 3 hours. The excess of diethyl sulfate was destroyed by refluxing with 240 cc. of 0.5 N sodium hydroxide for 1½ hours. The organic layer was washed with water and concentrated in vacuo. The residual oil was dissolved in ether and purified by repeated washing with 0.2 N sodium hydroxide and finally with water. The ether solution was dried and concentrated to an oil.

The oil was dissolved in the minimum volume of glacial acetic acid (ca. 15 cc.) and added to 200 cc. of 70% sulfuric acid (prepared by mixing 140 cc. concentrated sulfuric acid with 75 cc. water) at 105° C. This mixture was stirred and heated within 10 minutes to ca. 145° C. and the resulting clear solution was poured over 1.5 liters of crushed ice. The precipitated 2-ethylamino-5-chlorobenzophenone was allowed to crystallize, filtered off, washed with water and dried. After recrystallization from methanol, the product forms yellow prisms melting at 56–57°.

*Example 101*

2-amino-5-chloro-2'-methylbenzophenone (21 g.) was dissolved in 400 ml. ether and pyridine (6 ml.) and bromoacetylbromide (21 g.) dissolved in ether (50 ml.) was slowly added. After 2 hours the ether was washed several times with water and concentrated. The 2-(2-bromoacetamido)-5-chloro-2'-methylbenzophenone forming white crystals melting at 137–8° was filtered off.

*Example 102*

2-amino-2',5-dichlorobenzophenone (26.5 g.) was dissolved in pyridine (200 ml.) and tosylchloride (25 g.) added. The mixture was refluxed for 1 hour and left at room temperature overnight. After pouring the solution into water, crystals of 2',5-dichloro-2-(p-toluenesulfonamido)-benzophenone were collected and recrystallized from ethanol, M.P. 136–138°.

*Example 103*

2',5 - dichloro-2-(p-toluenesulfonamido)-benzophenone (31 g.) was dissolved with 1 N methanolic sodium methodixe solution (80 ml.) and enough methanol to produce a clear solution. The methanol then was removed in vacuo and the residue dissolved in dimethylformamide (200 ml.). On addition of methyliodide (25 ml.) the temperature of the solution increased to 30°. After 1 hour standing at room temperature the main amount of solvent was distilled off in vacuo and the residue poured into water. Crystals were collected and recrystallized to give 2',5,dichloro-2-(N-methyl-p-toluenesulfonamido)-benzophenone melting at 145°. After resolidification the M.P. is 153–5°.

*Example 104*

2' - 5 - dichloro - 2(N-methyl-p-toluenesulfonamido)-benzophenone was hydrolyzed in a mixture made of concentrated sulfuric acid (325 ml.), acetic acid (250 ml.) and ice (75 g.). After refluxing for 20 hours the mixture was poured on ice, and extracted with ether. All acids were removed by shaking the ether with 2 n NaOH. Concentrating the ether and addition of hexane yielded yellow crystals of 2',5-dichloro-2-methylaminobenzophenone, M.P. 78–80°. After resolidification the material melted at 88–90°.

Example 105

A mixture of 23.5 g. (0.094 m.) of 2-amino-5-chloro-2'- fluorobenzophenone and 21.5 g. (0.113 m.) of p-toluenesulfonyl chloride was dissolved in 100 ml. of pyridine and refluxed for ninety minutes. After distillation of 50 ml. of pyridine, the residue was poured into 250 ml. of water and stirred until the oil had solidified (thirty minutes). The precipitate was filtered and washed with 600 ml. of hot water followed by 300 ml. of petrol (B.P. 30–40° C.). The residue was recrystallized from methanol to give 2-p-toluenesulfonamido-5-chloro-2'-fluuorobenzophenone, yellow prisms, M.P. 119–120° C.

Example 106

A solution of sodium methoxide (0.02606 m.) in methanol was added to a solution of 8.3 g. (0.026 m.) of 2-p-tolylsulfonamido-5-chloro-2'-fluorobenzophenone in 75 ml. of toluene. The mixture was refluxed for thirty minutes and 15 ml. of toluene was distilled off. The mixture was refluxed a further fifteen minutes and an additional 10 ml. of toluene was distilled off to remove traces of water and methanol. The precipitated sodium salt was dissolved by the addition of 10 ml. of N,N-dimethylformamide. The mixture was then cooled to room temperature and two equivalents of dimethyl sulfate were added. The solution was then refluxed for 30 minutes, cooled, washed twice with 50 ml. of 5 N sodium hydroxide solution, twice with 50 ml. of water, and finally twice with 50 ml. of brine. The toluene solution was evaporated to dryness, and the pale yellow crystalline residue was recrystallized from methanol to give 2-(N-methyl - p - tolylsulfonamido) - 5-chloro-2'-fluorobenzophenone as white needles, M.P. 151–152° C.

Example 107

To 200 ml. 70% (w./v.) sulfuric acid preheated to 105° C., 10 g. of the N-methyl tosyl derivative prepared in Example 106 was added and the mixture stirred and heated to 145° C. until a clear solution resulted (approximately eight minutes). The mixture was poured over 1 kg. of crushed ice and the yellow reaction product filtered off, washed thoroughly with water, and recrystallized from methanol to give 2-methylamino-5-chloro-2'-fluorobenzophenone as yellow needles, M.P. 119–120°.

Example 108

150 cc. of benzoyl chloride was introduced with stirring at 120° into 100 g. of 3,5-dichloroaniline. The temperature was elevated to 180°, and 100 grams of anhydrous zinc chloride was added; the melt was heated to 230–242° for 2 hours and then poured into 250 cc. of 1 N hydrochloric acid. The mixture was refluxed and cooled. The resinous material was then separated and dissolved in a mixture of 600 cc. acetic acid and 1.2 l. 70% (by volume) sulfuric acid. The solution was refluxed for 3 hours, cooled, made alkaline with 50% potassium hydroxide, and extracted with ether. The aqueous layer was rejected, and the ether layer washed with an excess of 2 N HCl. The ether layer was then dried and concentrated. After recrystallization from petroleum ether, the residue forms yellow prisms of 2-amino-3,5-dichlorobenzophenone melting at 93–94°.

Example 109

11.5 g. of 1-methyl-7-chloro-5-(2-chlorophenyl)-3H-1,4-benzodiazepin-2(1H)-one was dissolved in 200 ml. of acetic acid and after the addition of 0.5 g. of PtO$_2$ shaken in a hydrogen atmosphere (1 atm., 25°). After the uptake of 1050 ml. of hydrogen the catalyst was filtered off, the solvent evaporated, the residue treated with sodium hydroxide solution and filtered. Crystals of 7-chloro-4,5-dihydro - 5 - (2-chlorophenyl)-1-methyl-3H-1,4-benzodiazepin-2-(1H)-one were obtained which, after several recrystallizations from a mixture of alcohol and ether, melted at 168–171°.

Example 110

To 1.38 liters of benzoyl chloride heated to 120° was added, with stirring and continued heating, 566 g. of 4-chloro-2-methylaniline. At a temperature of 180°, 800 g. of zinc chloride was introduced. The temperature was then raised to 220–225° and maintained there for 1.5 hours and then decreased to about 150°. 2 liters of 3 N hydrochloric acid was cautiously added and the biphasic mixture was refluxed for about 5 minutes. The hot aqueous layer was decanted and the residue washed once more with the same amount of 3 N hydrochloric acid.

The residue was refluxed for 15 hours with a mixture of 600 cc. of glacial acetic acid, 375 cc. of water and 700 cc. of concentrated sulfuric acid. The reaction mixture was poured on ice and extracted with methylene chloride. The methylene chloride extract was washed with water, dilute alkali, dilute hydrochloric acid, separated, dried and concentrated in vacuo to dryness. The residue was crystallized from petroleum ether to yield the crude product. Upon recrystallization from a mixture of ether and petroleum ether, the purified 2-amino-3-methyl-5-chlorobenzophenone formed yellow needles melting at 88.5–90°.

A mixture of 5.0 g. of activated charcoal (Norit–SG), 100 mls. of tetrahydrofuran, 5.0 mls. of 5% palladous chloride solution, 15.0 g. of powdered potassium acetate and 24.6 g. of 2-amino-3-methyl-5-chlorobenzophenone was shaken in a closed vessel in a hydrogen atmosphere (2 atmospheres pressure) until 0.1 mole of hydrogen was absorbed (5–6 hours). The mixture was then filtered and the yellow filtrate evaporated to a syrup in vacuo. The syrup was dissolved in methylene chloride and the solution washed with 3 N hydrochloric acid. The solvent layer was dried and evaporated in vacuo. The oily residue was crystallized from the petroleum ether (B.P. 30–50°) to give purified 2-amino-3-methylbenzophenone melting at 51–52°.

To an ice cold solution of 27.6 g. of 2-amino-3-methylbenzophenone in 200 cc. benzene was added, in portions with stirring, 14 cc. of bromoacetyl bromide and 155 cc. of 1 N sodium hydroxide at such a rate as to keep the mixture slightly acidic. The organic layer was then separated and washed with dilute alkali and water. The benzene solution was then dried, concentrated in vacuo to a small volume, and diluted with ether and petroleum ether. The precipitated crystals of 2-bromoacetamido-3-methylbenzophenone melted at 177–118°.

A solution of 18.2 g. of 2-bromoacetamido-3-methylbenzophenone in 300 cc. of liquid ammonia was stirred at atmospheric pressure until the ammonia had evaporated (about 5 hours). The residue was dissolved in benzene and washed with water. The organic layer was dried and concentrated in vacuo. The residual syrup was dissolved in pyridine, refluxed for 3 hours and concentrated in vacuo to dryness. The residue was crystallized from a mixture of benzene and petroleum ether yielding the crude 9-methyl-5-phenyl-3H-1,4-benzodiazepin-2(1H)-one which was crystallized from a mixture of methylene chloride and petroleum ether. It formed colorless prisms melting at 184–185°.

Example 111

A mixture of 500 cc. of benzene, 46 g. of phosphorus pentachloride and 48.7 g. of N-(2-carboxy-5-methylphenyl)-N',N'-dimethylformamide hydrochloride is refluxed and stirred for 1 hour and cooled to 25°. 130 g. of aluminum chloride and 50 cc. of benzene is added and the mixture is refluxed for 10 hours. 450 g. of ice is then added, the mixture is made alkaline with 700 cc. of 40% sodium hydroxide solution and refluxed for 5 hours. The benzene layer is separated, concentrated, and the residue refluxed with a mixture of 200 cc. of ethanol and 200 cc. of 20% sodium hydroxide for 12 hours. The alcohol and most of the water are removed in vacuo and, to the residue, 250 cc. of water and 150 cc. of benzene are added. The benzene layer is separated and concentrated in vacuo yielding crude 2-amino-4-methylbenzophenone. Upon treatment with petroleum ether, a yellow crystalline precipitate is formed which is filtered off. It melts at 68–70°.

A mixture of 21.8 g. of 2-amino-4-methylbenzophenone, 100 cc. of pyridine, 1 cc. of piperidine, and 30 g. of glycine ethyl ester hydrochloride is refluxed for 16 hours. The reaction mixture is concentrated in vacuo and the residue is heated up with 150 cc. of benzene and 100 cc. of water. This mixture is then cooled to 10° and filtered. The crude product, 8-methyl-5-phenyl-3H-1,4-benzodiazepin-2(1H)-one, remaining on the funnel is washed with water and crystallized from a mixture of methanol and acetonitrile forming prisms melting at 255–256°.

The above mentioned N-(2-carboxy-5-methylphenyl)-N,N'-dimethylformamide hydrochloride and its preparation are not a part of this invention but such is set forth below in order that the present disclosure may be complete.

To a solution of 32.7 g. of 4-methylanthranilic acid in 100 cc. of dimethylformamide cooled to −10° is added dropwise 20 cc. of thionyl chloride. The temperature rises to about 5°. The mixture is then stirred at room temperature for 3 hours, diluted with 600 cc. of acetone, cooled to +5° and stirred for an additional 3 hours. The reaction product, N-(2-carboxy-5-methylphenyl)-N,N'-dimethylformamide hydrochloride, is filtered off, washed with cool acetone and dried. After recrystallization from a mixture of acetonitrile and alcohol containing a small amount of hydrogen chloride, the product forms crystals melting at 196–198°.

Example 112

160 g. of o-fluorobenzoic acid chloride was heated with stirring to 110°. To this was added, over a period of about 30 minutes, 47.2 g. of p-toluidine. The resulting mixture was slowly heated within 30 minutes to 180°. Then, 100 g. of zinc chloride was added over a period of about 30 minutes. To complete the reaction, the mixture was gradually heated within 1 hour to 225–230° and kept for 2 hours at this temperature. After the reaction mixture had cooled to 100°, 800 ml. of hot water was slowly added and the resulting mixture refluxed for 15 minutes. The hot aqueous phase was siphoned off. This extraction with hot water was repeated 3 times. The residual brown, water insoluble solid was hydrolyzed by refluxing for 6 hours with a mixture of 70 ml. of water, 100 ml. of acetic acid and 130 ml. of concentrated sulfuric acid. The resulting reaction mixture was diluted with water and extracted with a mixture of ether and petroleum ether. The organic layers were washed 4 times with water, 3 times with 3 N sodium hydroxide and again 3 times with water. After drying over sodium sulfate, the organic extracts were concentrated in vacuo to yield crude 5-methyl-2-amino-2'-fluorobenzophenone which upon crystallization from benzene-hexane melted at 68.5–69.5° (yellow needles).

Example 113

39 g. of o-chlorobenzoyl chloride was warmed to 110°. With stiring 10.7 g. of p-toluidine was added and the mixture heated to 180°. Then 20 g. of anhydrous zinc chloride was added and the temperature raised to 220° during 1 hour. After cooling to 130°, 200 ml. of water was added and the mixture heated to reflux for 5 minutes with vigorous stirring. The hot water layer was then decanted and the procedure was repeated 3 times.

The water-insoluble residue was then refluxed for 10 hours with a mixture of 25 ml. of water, 35 ml. of acetic acid and 50 ml. of concentrated sulfuric acid. The resulting dark solution was cooled, poured into ice-water and the mixture extracted with ether. The ether solution was shaken with 2 N sodium hydroxide. Concentration of the dark ether solution yielded 5-methyl-2-amino-2'-chlorobenzophenone as a yellow oil which after three crystallizations from hexane melted at 106–107°.

A mixture of 30 g. of 5-methyl-2-amino-2'-chlorobenzophenone, 200 ml. of pyridine, 3 ml. of piperidine and 50 g. of glycine ethyl ester hydrochloride was heated to reflux for 17 hours. The solvent was then evaporated in vacuo and the residue treated with water and extracted with ether. The ether extract was dried with sodium sulfate and concentrated to yield a yellow oil which was chromatographed on 700 g. of neutral aluminum oxide, activity III. A first elution was performed with benzene-petroleum ether (1:1). Further elution with ether yielded white crystals of 7-methyl-5-(2-chlorophenyl)-3H-1,4-benzodiazepin-2(1H)-one, which after several recrystallizations from methanol, melted at 223–224°.

Example 114

10 g. of 7-chloro-4,5-dihydro-5-phenyl-3H-1,4-benzodiazepin-2(1H)-one was dissolved in 25 cc. of N,N-dimethylformamide by heating on a steam bath. 8.73 cc. of a solution of sodium in methanol (0.00435 m./cc.) was then added and the reaction mixture heated on a steam bath for a further 10 minutes and then cooled to room temperature. To the resulting suspension of the sodio derivative was added 2.27 cc. of methyl iodide. The reaction mixture was then allowed to stir at room temperature for 30 minutes after which it was concentrated in vacuo to an oil which was partitioned between benzene and water. The aqueous phase was separated and the benzene layer was subsequently washed with water (5 x 100 cc.). The benzene solution was then dried over anhydrous sodium sulfate, filtered and concentrated under reduced pressure to 10.7 g. of an oil. The oil was exhaustively extracted with ether, the extract filtered and the filtrate concentrated yielding 1-methyl-7-chloro-4,5-dihydro - 5 - phenyl - 3H - 1,4 - benzodiazepin-2(1H)-one melting at 139–141°.

Example 115

50.0 g. of 2-amino-5-chloro-2'-fluorobenzophenone in 300 cc. of tetrahydrofuran was hydrogenated at atmospheric pressure in the presence of 10 g. of charcoal (Norit), 30.0 g. of potassium acetate and 2.5 cc. of a 20% palladous chloride solution (20% by weight of palladium). After an initiation period varying from ten minutes to an hour, hydrogen uptake was rapid and stopped completely after the absorption of the theoretical amount. Filtration of the catalyst over a "Hyflo" pad and removal of the solvent left a yellow crystalline residue. The crude mixture of ketone and potassium acetate was partitioned between methylene chloride (300 cc.) and water (1 l.) The layers were separated and the water layer washed with methylene chloride (3 x 50 cc.). The organic layers were combined, washed with 3 N sodium hydroxide solution (2 x 50 cc.), water (3 x 100 cc.), saturated brine solution (3 x 100 cc.), dried over anhydrous sodium sulfate and filtered. The solvent was removed and the product recrystallized from ethanol to give 2-amino-2'-fluorobenzophenone as yellow prisms melting at 126–8°.

Example 116

A mixture of 2-amino-2'-fluorobenzophenone and p-toluenesulfonyl chloride (3.2 g.) was dissolved in pyridine (15 cc.) and refluxed for ninety minutes. A total of two thirds of the pyridine was removed by distillation and the residue poured into water (500 cc.). The mixture was stirred until the product had solidified, and then filtered. The precipitate was dissolved in methylene chloride (50 cc.), and the resulting solution washed with 2 N hydrochloric acid (3 x 25 cc.), water (3 x 25 cc.), saturated brine solution (2 x 50 cc.), dried over anhydrous sodium sulfate treated with Norit and filtered. Removal of the solvent and crystallization of the residue from ethanol gave 2-p-toluenesulfonamido-2'-fluorobenzophenone as white needles melting at 129.5–130°.

Example 117

A solution of 21.5 g. of 2-amino-2'-fluorobenzophenone in 500 cc. of ether was treated with 20 cc. of a 20% (v./v.) solution of bromoacetylbromide in ether. The mixture was shaken and allowed to stand for five minutes and then washed with water (20 cc.). The process was repeated five times. The final solution was washed thoroughly with water (5 x 500 cc.) and concentrated to 100 cc. The crystals were filtered and recrystallized from methanol to give 2-bromoacetamido-2'-fluorobenzophenone as white needles melting at 117–118.5°.

A solution of 23.7 g. of 2-bromoacetamido-2'-fluorobenzophenone in tetrahydrofuran (100 cc.) was added to liquid ammonia (approximately 500 cc.), and allowed to evaporate overnight. The residue was treated with water (1 l.) and the crystals filtered off and refluxed in toluene (100 cc.) for thirty minutes. The mixture was charcoaled (Norit) and filtered over "Hyflo." The solution was concentrated to a small volume (25 cc.) cooled, diluted with 20 cc. of ether and allowed to stand. The product was recrystallized from acetone/hexane to give 5 - (2-fluorophenyl)-3H-1,4-benzodiazepin-2(1H)-one as white needles melting at 180–181°.

A 50% suspension of sodium hydride in heavy mineral oil (6.24 g.) was added portionwise to a stirred solution of 5-(2-fluorophenyl)-3H-1,4-benzodiazepin-2(1H)-one (30 g.) in 60 cc. of N,N-dimethylformamide. The mixture was allowed to stir for fifteen minutes in the cold, methyl iodide then added (20.1 g., 8.75 cc.) and the solution stirred a further twenty minutes. The solvent was removed under reduced pressure to give an oil which was partitioned between water, methylene chloride (1 l/300 cc.). The water layer was extracted with methylene chloride (6 x 200 cc.), the organic layers combined, washed with water (2 x 100 cc.) 3 N hydrochloric acid (1 x 50 cc.), water (3 x 100 cc.), dried over anhydrous sodium sulfate and filtered. Removal of the solvent gave an oil which was taken up in ether and filtered through a pad of grade I neutral alumina. Concentration of the colorless solution gave, on standing, white prisms of 1-methyl - 5-(2-fluorophenyl)-3H-1,4-benzodiazepin-2(1H)-one melting at 113–114°.

Example 118 p-Fluorobenzoyl chloride (66 g.) was heated in a 2 l. three neck round bottom flask, fitted with a thermometer, condenser and stirrer, to 160° and p-chloraniline (24 g.) was then added thereto. The temperature was raised to 200° and zinc chloride (33 g.) was introduced. The temperature was maintained at 200–210° for one hour and then the reaction was quenched by the careful addition of 250 cc. of 3 N hydrochloric acid. The resulting mixture was refluxed for a few minutes and the acid portion decanted. The process of boiling with 250 cc. portions of 3 N hydrochloric acid was repeated three times. The residue was then hydrolyzed by refluxing in 500 cc. of concentrated hydrochloric acid for 17 hours. The mixture was cooled and made alkaline with 10 N sodium hydroxide, keeping the temperature below 30° by external cooling. The resulting yellow precipitate was filtered, dissolved in methylene chloride (300 cc.) and washed with 3 N hydrochloric acid (3 x 100 cc.). The organic layer was washed acid free with water (4 x 50 cc.), dried over anhydrous sodium sulfate, filtered and concentrated to an oil. The residue was dissolved in 2 l. of hexane, filtered, concentrated to 500 cc. and allowed to crystallize. The crystals were filtered to give yellow needles of 2-amino-5-chloro-4'-fluorobenzophenone melting at 108–9°.

Example 119

A mixture of 2-amino-5-chloro-4'-fluorobenzophenone (3.0 g.) and p-toluenesulfonyl chloride (2.8 g.) in pyridine (15 cc.) was refluxed for 90 minutes. Two thirds of pyridine was removed by distillation and the residue poured into 1 l. of water and stirred for one hour. The crystalline residue was filtered, dissolved in methylene chloride (150 cc.) and the solution washed with 3 N hydrochloric acid (2 x 25 cc.), water (3 x 50 cc.), saturated brine solution (2 x 50 cc.), dried over anhydrous sodium sulfate and filtered. Methylene chloride was removed and the residue recrystallized from methanol to give 2-p-toluene - sulfonamido - 5 - chloro - 4' - fluorobenzophenone as white prisms melting at 126–8°.

Example 120

2-amino-5-chloro-4'-fluorobenzophenone (55 g.) was dissolved in ether (1 l.) and an excess of bromoacetyl bromide (45.7 g.) added. The mixture was allowed to stand at room temperature overnight (17 hours) and the crystalline precipitate filtered off. The filtrate was concentrated to a small volume and the crystals filtered to give colorless needles of 2-bromoacetamido-5-chloro-4'-fluorobenzophenone melting at 97–98°.

A solution of 2-bromoacetamido-5-chloro-4'-fluorobenzophenone (17.3 g.) in tetrahydrofuran (50 cc.) was added to approximately 300 cc. of liquid ammonia. The solution was allowed to evaporate overnight and then diluted with water (500 cc.). The precipitate was filtered, washed well with hot water and dissolved in methylene chloride. The methylene chloride solution was dried over anhydrous sodium sulfate, filtered and concentrated to dryness. The residue was dissolved in toluene (400 cc.) and the solution was distilled at atmospheric pressure until 385 cc. of toluene had been recovered. The residual material was recrystallized from an acetone/hexane mixture to give 7 - chloro - 5 - (4 - fluorophenyl) - 3H - 1,4-benzodiazepin-2(1H)-one as white prisms melting at 223–224°.

Example 121

A mixture of 50 g. of 2-amino-5-bromo-2'-fluorobenzophenone and 38.8 g. of p-toluenesulfonyl chloride was refluxed in 200 ml. of pyridine for 90 minutes. The pyridine was then distilled off until the volume was reduced to 100 ml., the residue poured into 250 ml. of water and stirred. The resulting precipitate was filtered off and washed with 600 ml. of hot water followed by 300 ml. of petroleum solvent (B.P. 30–40°). The resulting product was recrystallized from methanol to give 2-p-toluenesulfonamido - 5 - bromo - 2' - fluorobenzophenone as white prisms melting at 114–115°.

A mixture of 2-(p-toluenesulfonamido)-5-bromo-2'-fluorobenzophenone (5.0 g.), sodium methoxide in methanol (2.54 cc. 0.0044 m./cc.) and toluene (25 cc.), was stirred at room temperature for thirty minutes. Dimethyl sulfate (2.8 cc.) was added and the solution stirred for two hours. Excess dimethyl sulfate was then decomposed by the addition of 3 N sodium hydroxide solution (25 cc.) and stirring for a further ten minutes. The two layers were separated and the water layer extracted with methylene chloride (2 x 25 cc.). The organic layers were combined, washed with 3 N sodium hydroxide solution (3 x 25 cc.), water (3 x 50 cc.), saturated brine solution (2 x 50 cc.), dried over anhydrous sodium sulfate and filtered. Removal of the solvent gave an oil which was crystallized from ethanol to give white needles of 2-(N-methyl - p - toluenesulfonamido) - 5 - bromo - 2' - fluorobenzophenone melting at 154–5°.

2 - (N - methyl - p - toluenesulfonamido) - 5 - bromo-2'-fluorobenzophenone (3.2 g.) was dissolved in 40 cc. of an 80% (v./v.) sulfuric acid solution at 105°. Heating was continued until the temperature reached 145° and the solution was then poured over 500 g. of crushed ice. The solution was diluted to 1 l. with water and filtered. The obtained yellow pricipitate was washed well with water, and dissolved in methylene chloride (50 cc.). The solution was dried over anhydrous sodium filtrate, filtered and the solvent removed giving a yellow oil which was crystallized from hexane yielding yellow needles of 2 - N - methylamino - 5 - bromo - 2' - fluorobenzophenone melting at 112–113°.

Example 122

A solution of 21.5 g. of 5-chloro-2-aminobenzophenone and 25 g. of dl-valine ethyl ester hydrochloride in 150 ml. of pyridine was slowly distilled to remove pyridine and volatile reaction products. Fresh pyridine was added at intervals to keep the volume of pyridine above 75 ml. The total reaction time was 23 hours. The solution was concentrated in vacuo to an oil which was partitioned between ether and water. The aqueous layer was further extracted with ether and the combined ether extracts dried over sodium sulfate and then concentrated to a small volume and allowed to crystallize at 0°. The product was filtered off and recrystallized from a mixture of ether and petroleum ether to give 7-chloro-3-(1'-methylethyl) - 5 - phenyl - 3H - 1,4 - benzodiazepin - 2(1H)-one as colorless plates melting at 226–227°.

Example 123

A solution of 23.15 g. of 2-amino-5-chlorobenzophenone and 30 g. of L-leucine ethyl ester hydrochloride in 150 ml. of pyridine was refluxed overnight and then concentrated in vacuo. The residue was partitioned between ether and water. The ether solution was treated with 5 N hydrochloric acid and yielded a precipitate (the hydrochloride of the reaction product) which was suspended in water, covered with ether and treated with an excess of ammonium hydroxide solution. The free base was extracted into the ether and the ether solution, after drying over sodium sulfate and treatment with charcoal, concentrated in vacuo. Treatment of the residual gum with petroleum ether (B.P. 30–60°) and crystallization of the insoluble part from a mixture of chloroform and hexane gave 7 - chloro - 3 - (2',2' - dimethylethyl) - 5 - phenyl-3H-1,4-benzodiazepin-2(1H)-one as colorless prisms melting at 213–214°.

Example 124

A mixture of 15 g. of 2 - amino - 5 - fluorobenzophenone, 9.75 g. of glycine ethyl ester hydrochloride and 200 ml. pyridine was refluxed 16 hours. Then the reaction mixture was cooled, diluted with water and extracted with ether. The organic layer was dried and concentrated in vacuo. The residue was crystallized from ether yielding the reaction product 7-fluoro-5-phenyl-3H-1,4-benzodiazepin-2(1H)-one which after crystallization from a mixture of acetone and petroleum ether formed colorless prisms melting at 197–8°.

Example 125

A solution of 36.9 g. of 2-amino-5-chlorobenzophenone and 29.19 g. of dl-O-methylserine ethyl ester hydrochloride in 180 ml. of pyridine was refluxed in a nitrogen atmosphere for 8 hours during which time 50 ml. of solvent containing the formed water and alcohol was slowly distilled off. Then the reaction mixture was concentrated in vacuo and the residue was partitioned between benzene (100 ml.) and water (100 ml.). The benzene layer was again extracted with water and then concentrated to a low volume. The solution was chromatographed on a column of 300 g. of grade II (3% water) alumina. The column was first eluted with benzene to give an oil and was then eluted with ether to give a partially crystalline material which upon crystallization from ether yielded the reaction product 7-chloro-5-phenyl-3-methoxymethyl-3H-1,4 - benzodiazepin - 2(1H) - one. Recrystallization from ether gave colorless prisms melting at 166–7°.

The O-methyl-serine ethyl ester hydrochloride used above was prepared from dl-O-methylserine as follows: A suspension of 20 g. of dl-O-methylserine in 160 ml. of ethanol was saturated with hydrogen chloride over a period of 1 hour and the resulting solution was then refluxed for 1 hour. The solvent was then removed in vacuo and the residue was twice evaporated to dryness after the addition of each of two 50 ml. portions of chloroform. The residue crystallized and was used without purification.

Example 126

A stirred solution of 75 g. of 2-amino-2'-nitrobenzophenone in 700 ml. of hot concentrated hydrochloric acid was cooled to 0° and a solution of 21.5 g. of sodium nitrite in 50 ml. of water was added in the course of 3 hours. The temperature of the suspension was kept at 2–7° during the addition. The resulting clear solution was poured into a stirred solution of 37 g. of cuprous chloride in 350 ml. of hydrochloric acid 1:1. The solid which had formed after a few minutes was filtered off, washed with water and recrystallized from ethanol. Crystals of 2-chloro-2'-nitrobenzophenone melting at 76–79° were obtained.

A solution of 20 g. of 2-chloro-2'-nitrobenzophenone in 450 ml. of ethanol was hydrogenated at normal pressure and room temperature with Raney nickel. After uptake of ca. 6 liters of hydrogen the catalyst was filtered off, and the alcohol then removed in vacuo. The residue was distilled in a bulb tube at 0.4 mm. and a bath temperature of 150–165° giving a yellow oil. The oil was dissolved in alcohol, and on addition of water, needles of 2-amino-2'-chlorobenzophenone melting at 58–60° were obtained.

To a solution of 42 g. of 2-amino-2'-chlorobenzophenone in 500 ml. of benzene, 19 ml. of bromoacetyl bromide was added dropwise. After refluxing for 2 hours, the solution was cooled, washed with 2 N sodium hydroxide and evaporated. The residue was recrystallized from methanol giving crystals of 2-bromo-2'-(2-chlorobenzoyl)acetanilide melting at 119–121°.

To a solution of 14.5 g. of 2-bromo-2'-(2-chlorobenzoyl)acetanilide in 100 ml. of tetrahydrofuran, an excess of liquid ammonia (ca. 150 ml.) was added. The ammonia was kept refluxing with a Dry-Ice condenser for 3 hours after which time the ammonia was allowed to evaporate and the solution was poured into water. Crystals of 2 - amino - 2' - (2 - chlorobenzoyl)acetanilide were collected, which after recrystallization from ethanol melted at 162–164°.

A solution of 3 g. of 2-amino-2'-(2-chlorobnezoyl)acetanilide in 50 ml. of pyridine was refluxed for 24 hours after which time the pyridine was removed in vacuo. The residue was recrystallized from methanol and a mixture of dichloromethane and ether giving crystals of 5-(2-chlorophenyl)-3H-1,4-benzodiazepin-2(1H) - one melting at 212–213°.

Example 127

A mixture of 5.7 mm. of 2-amino-5-chloro-2'-fluorobenzophenone and 6.8 mm. of p-toluenesulfonyl chloride in 15 ml. of pyridine was refluxed for 90 minutes. About half of the pyridine was then distilled off, the residue poured into 50 ml. of water and extracted with methylene chloride (3 x 25 ml.). The combined methylene chloride extracts were then washed with 2 N hydrochloric acid (2 x 50 ml.), water (2 x 25 ml.), saturated brine (2 x 25 ml.), dried over anhydrous sodium sulfate and filtered. Removal of the solvent gave an oil which was crystallized from ethanol to yield 2-p-toluenesulfonamido-5-chloro-2'-fluorobenzophenone as white needles melting at 132–133°.

Example 128

To a solution of 100 g. of 2-amino-2',5-dichlorobenzophenone in 400 ml. of toluene, 35 ml. of chloroacetyl chloride was added dropwise with stirring. After the solution had cooled to 25°, 220 ml. of 2 N sodium hydroxide was added cautiously and the mixture stirred for 30 minutes. Crystals which separated were filtered off after cooling. The toluene was concentrated in vacuo to yield another crop of crystals. Recrystallization from methanol gave 2-(2-chloroacetamido)-2',5-dichlorobenzophenone as white needles melting at 157–159°.

2-(2-chloroacetamido)-2',5-dichlorobenzophenone (50 g.) was dissolved in 500 ml. of dimethylformamide and placed into a three-necked flask equipped with gas inlet tube, stirrer and Dry Ice condenser. Liquid ammonia (200 ml.) was passed into the solution until a steady reflux of ammonia was observed. After ca. 5 hours the cooling was discontinued and the excess of ammonia was allowed to evaporate overnight. 24 hours after the reaction had been started the dimethylformamide was distilled off on a steam bath under reduced pressure (ca. 20 mm.).

The residue was dissolved in 1000 ml. of pyridine and refluxed for 20 hours. After this time the solvent was removed in vacuo and the residue treated with water and ether. The organic phase was repeatedly washed with water and concentrated. Crude crystals separated and were recrystallized from methanol yielding colorless crystals of 7-chloro-5-(2-chlorophenyl)-3H-1,4-benzodiazepin-2(1H)-one melting at 199–201°. 7-chloro-5-(2-chlorophenyl)-3H-1,4-benzodiazepin-2(1H)-one was also made as follows. 2-amino-2',5-dichlorobenzophenone (100 g.) was treated with bromoacetyl bromide (100 g.) in 500 ml. of benzene. After a few hours the reaction mixture was washed with sodium bicarbonate solution and water. Crystals which had separated from the benzene solution were filtered off and an additional crop was collected after concentrating the mother liquor. Recrystallization from benzene yielded pure 2-bromoacetamido-2',5-dichlorobenzophenone melting at 136°, 4.2 g. of which was dissolved in tetrahydrofuran (75 ml.) in a three-necked flask equipped with stirrer, gas inlet tube and Dry Ice condenser. About 100 ml. of liquid ammonia was added and the mixture was refluxed for several hours. The solution was stirred overnight and the excess of ammonia allowed to evaporate. The mixture was then concentrated in vacuo and the residue treated with water, causing the precipitation of crystals which were heated (170°) above the melting point for 1 hour. The formed brown melt was triturated with methanol and filtered, and the filtrate concentrated to yield 7-chloro-5-(2-chlorophenyl)-3H-1,4-benzodiazepin-2(1H)-one.

Example 129

A suspension of 20 g. of 5-(2-chlorophenyl)-3H-1,4-benzodiazepin-2(1H)-one and 1 g. of platinum oxide in 500 ml. of ethanol was shaken in a hydrogen atmosphere (25°, 1 atm.). After the uptake of 2400 ml. of hydrogen the catalyst was filtered off and the solvent stripped in vacuo. The residue crystallized from a mixture of dichloromethane and ethanol, forming white prisms of 5-(2-chlorophenyl)-4,5-dihydro-3H-1,4-benzodiazepin-2(1H)-one. After recrystallization from ethyl acetate the product melted at 187–189°.

A solution of 17.0 g. of 5-(2-chlorophenyl)-4,5-dihydro-3H-1,4-benzodiazepin-2(1H)-one in 50 ml. of N,N-dimethylformamide was stirred and refluxed for one hour with 2.99 g. of sodium methoxide (added in the form of a methanolic solution containing 4.35 mmoles of sodium methoxide per cc. of solution). The sodio derivative thus formed was treated with 78.6 g. of methyl iodide, and the solution refluxed for a further two hours. After the excess methyl iodide had been distilled off, the reaction mixture was poured into 1,000 ml. of water and extracted four times with 150 ml. portions of methylene chloride. The extracts were combined, treated with carbon (Norit), dried over anhydrous sodium sulfate and filtered. The solvent was then removed and the residual oil dissolved in a small volume of methanol and treated with an equivalent of hydrogen chloride added as a methanolic hydrogen chloride solution (0.9 N). Solvent was then removed under reduced pressure and the residue recrystallized from acetone/ether to yield 1,4-dimethyl-5-(2-chlorophenyl)-4,5-dihydro-3H-1,4-benzodiazepin-2(1H)-one hydrochloride as white needles melting at 240–241°.

Example 130

A solution of 15.5 g. of 5-(2-chlorophenyl)-3H-1,4-benzodiazepin-2(1H)-one in 70 ml. of 1 N solution of sodium methoxide in methanol was stripped of solvent in vacuo. The residue was dissolved in 150 ml. of dimethylformamide. On addition of 10 ml. of methyl iodide the temperature of the solution rose from 25° to 50°. After letting the mixture cool to room temperature the excess of methyl iodide was removed in vacuo and the solution was poured into 1000 ml. of water. A white precipitate was formed which was filtered off and crystallized from methanol. Recrystallization from a mixture of benzene and petroleum yielded 5-(2-chlorophenyl)-1-methyl-3H-1,4-benzodiazepin-2(1H)-one as white prisms melting at 135–137°.

A solution of 5.8 g. 5-(2-chlorophenyl)-1-methyl-3H-1,4-benzodiazepin-2(1H)-one in 70 ml. of acetic acid was hydrogenated at 25° and atmospheric pressure using 0.1 g. of platinum oxide as catalyst. After the uptake of 600 ml. of hydrogen the catalyst was filtered off and the solution poured on ice and neutralized with ammonia. The solution was extracted with dichloromethane and the organic phase dried with sodium sulfate. Partial concentration of this solution and addition of ether gave 5-(2-chlorophenyl)-1-methyl-4,5-dihydro-3H-1,4-benzodiazepin-2(1H)-one as crystals melting at 177–180°.

Example 131

A solution of 7.6 g. of 7-chloro-5-(2-chlorophenyl)-3H-1,4-benzodiazepin-2(1H)-one in 30 ml. of a 1 N solution of sodium methoxide in methanol was stripped of solvent in vacuo. The residue was dissolved in 50 ml. of dimethylformamide and 9 g. of propargyl bromide was added dropwise to the stirred solution. The temperature rose to 50° and stirring was continued for one half hour. The excess of propargyl bromide was removed in vacuo and the remaining solution poured into ice water. Crystals of 7-chloro-5-(2-chlorophenyl)-1-(2-propynyl)-3H-1,4-benzodiazepin-2(1H)-one separated which after recrystallization from ethanol melted at 140–142°.

Example 132

A solution of 15 g. of 7-chloro-5-(2-chlorophenyl)-3H-1,4-benzodiazepin-2(1H)-one in 60 ml. of 1 N solution of sodium methoxide in methanol was stripped of solvent in vacuo. The residue was dissolved in 100 ml. of dimethylformamide and 30 g. of isopropyl iodide was added. The solution was kept for 1 hour at a temperature of 50°, cooled and poured on ice. The aqueous phase was extracted with ether. The ether was washed with water, dried with sodium sulfate and concentrated. Prisms of 7-chloro-5-(2-chlorophenyl)-1-isopropyl-3H-1,4-benzodiazepin-2(1H)-one were obtained which after repeated recrystallization from ether melted at 148–150°.

Example 133

A solution of 15 g. of 7-chloro-5-(2-chlorophenyl)-3H-1,4-benzodiazepin-2(1H)-one in 55 ml. of a 1 N solution of sodium methoxide in methanol was stripped of solvent in vacuo. The residue was dissolved in 75 ml. of dimethylformamide and 12 g. allyl bromide was added dropwise under stirring. The temperature of the solution rose spontaneously to 50°. After one hour the solution had cooled to room temperature, was poured into ice water and extracted with ether. The ether was washed with water and evaporated. The residue was dissolved in ethanol yielding crystals of 7-chloro-5-(2-chlorophenyl)-1-(2-propenyl)-3H-1,4-benzodiazepin-2(1H)-one which after recrystallization from a mixture of benzene and petroleum ether melted at 128–130°.

*Example 134*

A mixture of 13.8 g. of 2-amino-5-bromobenzophenone and 30.3 g. of bromoacetyl bromide in 100 cc. of benzene was refluxed for 90 minutes until there was no further evolution of hydrogen bromide. Water (100 cc.) was then added and the mixture cooled. The layers were separated, and the organic layer was washed with water (5 x 100 cc.), 30 percent sodium carbonate solution (1 x 100 cc.), saturated brine (2 x 50 cc.), dried over anhydrous sodium sulfate and filtered. Concentration of the benzene solution to about 20 cc., followed by cooling and recrystallization from methanol, and treatment with decolorizing carbon (Norit) gave 5-bromo-2-bromoacetamidobenzophenone as white needles melting at 117.5–118.5°.

A solution of 17 g. of 5-bromo-2-bromoacetamidobenzophenone in 200 cc. of tetrahydrofuran was carefully poured into 1 liter of liquid ammonia. The ammonia was allowed to evaporate overnight, and the resulting solution was then evaporated to dryness under reduced pressure. The residue was partitioned between water (150 cc.) and methylene chloride (200 cc.). The layers were separated, and the organic layer washed with water (4 x 100 cc.), saturated brine (1 x 50 cc.), dried over anhydrous sodium sulfate, filtered, and concentrated to dryness. The residue was dissolved in benzene and refluxed on a steam bath for 30 minutes, which caused the precipitation of the reaction product. The mixture was cooled and the precipitated 7 - bromo - 5-phenyl-3H-1,4-benzodiazepin-2(1H)-one (colorless prisms melting at 219–220.5°) was filtered off.

1.0 g. of platinum oxide was reduced in 150 cc. of acetic acid at atmospheric pressure and room temperature. To the suspension of reduced catalyst a solution of 19.5 g. of 7 - bromo - 5-phenyl - 3H-1,4-benzodiazepin-2(1H)one in 150 cc. of glacial acetic acid was added and hydrogenated to completion (1390 cc. of hydrogen absorbed). Filtration of the catalyst over a filter aid using suction, and concentration of the filtrate under reduced pressure gave the crude product which was dissolved in methylene chloride (150 cc.). The resulting solution was then washed with 5 N ammonium hydroxide solution (3 x 25 cc.), water (3 x 25 cc.), dried over anhydrous sodium sulfate, filtered and evaporated. Recrystallization from N,N-dimethylformamide/water yielded 7-bromo-4,5-dihydro-5-phenyl-3H-1,4-benzodiazepin-2(1H)-one as white needles melting at 191–192°.

A solution of 15.0 g. of 7-bromo-4,5-dihydro-5-phenyl-3H-1,4-benzodiazepin-2(1H)-one in 100 ml. of N,N-dimethylformamide was stirred and refluxed for one hour with 3.05 g. of sodium methoxide (added in the form of a methanolic solution containing 4.35 mmoles of sodium methoxide per cc. of solution). The sodio derivative thus formed was treated with 155 g. of methyl iodide, and the solution refluxed for a further two hours. After the excess methyl iodide had been distilled off, the reaction mixture was poured into 1,000 ml. of water and extracted four times with 150 ml. portions of methylene chloride. The extracts were combined, treated with decolorizing carbon, dried over anhydrous sodium sulfate, and filtered. The solvent was then removed and the residual oil dissolved in a small volume of methanol and treated with one equivalent of hydrogen chloride added as a methanolic hydrogen chloride solution (0.9 N). Solvent was then removed under reduced pressure and the residue was crystallized from methanol/ether yielding 7-bromo-1,4-dimethyl - 4,5 - dihydro - 5-phenyl - 3H-1,4-benzodiazepin-2 (1H)-one as white needles melting at 166–172°.

*Example 135*

A stirred solution of 18 g. of 2-amino-5-methylbenzophenone in 100 cc. of ether was treated with 4.5 cc. of bromoacetyl bromide. After 2–3 minutes, ice and water were added and additional amounts of bromoacetyl bromide introduced. The temperature of the reactants was kept below 20° by the addition of ice while a total of 11.4 cc. of bromoacetyl bromide was added. At the end of the addition, the ether was washed with water, and the crystallized material was filtered off yielding 2-bromoacetamido - 5 - methylbenzophenone. Treatment of the mother liquors with bromoacetyl bromide gave a further crop. Recrystallization from a mixture of benzene and ether yielded colorless prisms melting at 116–117°.

A solution of 3.32 g. of 2-bromoacetamido-5-methylbenzophenone in approximately 200 cc. of liquid ammonia was stirred for one hour. The ammonia was then evaporated in ca. 10 minutes using water bath at room temperature. The residue was partitioned between water and methylene chloride.

The methylene chloride solution was dried over sodium sulfate, concentrated in vacuo and the residue refluxed with 40 ml. of benzene for 45 minutes. The solution was concentrated in vacuo and the residue crystallized from boiling ethanol. The reaction product was filtered off to yield 7-methyl-5-phenyl-3H-1,4-benzodiazepin-2(1H)-one melting at 209–210°.

1.0 g. of platinum oxide was hydrogenated in 100 ml. of acetic acid at atmospheric pressure and room temperature. To the suspension of reduced catalyst a solution of 18.8 g. of 7 - methyl - 5 - phenyl-3H-1,4-benzodiazepin-2 (1H)-one in 100 ml. of glacial acetic acid was added and the resulting mixture hydrogenated to completion (1680 cc. of hydrogen absorbed). Filtration of the catalyst and concentration of the filtrate under reduced pressure gave crude product which was dissolved in methylene chloride (150 cc.). The resulting solution was washed with a 5 N ammonium hydroxide solution (3 x 25 cc.) and water (3 x 125 cc.), dried over anhydrous sodium sulfate, filtered and evaporated. Recrystallization from ethanol yielded 7 - methyl - 4,5-dihydro-5-phenyl-3H-1,4-benzodiazepin-2 (1H)-one as white needles melting at 174–176°.

A mixture of 6.0 g. of 7-methyl-4,5-dihydro-5-phenyl-3H-1,4-benzodiazepin-2(1H)-one and 1.34 g. of sodium methoxide (added in the form of a methanolic solution containing 4.45 mmoles of sodium methoxide per cc. of solution) in 25 cc. of N,N-dimethylformamide was stirred for one hour at room temperature. 33.8 g. of methyl iodide was then added and the mixture heated on a steam bath for 14 hours. Removal of the solvent under reduced pressure gave a crystalline residue which was washed with ether and filtered. The ethereal filtrate gave 1,4,7-trimethyl-4,5-dihydro-5-phenyl-3H-1,4-benzodiazepin-2(1H)-one which, when recrystallized from hexane, formed colorless needles melting at 71–73°. The precipitate was washed with water and recrystallized from a methanol/ether mixture yielding 1,2,4,5-tetrahydro-1,4,4,7-tetramethyl-2-oxo-5-phenyl-3H-1,4-benzodiazepinium iodide as white prisms melting at 160–161° (decomp.).

*Example 136*

1.0 g. of platinum oxide in 75 ml. of acetic acid was reduced at atmospheric pressure and room temperature. To the suspension of reduced catalyst a solution of 15.0 g. of 7-chloro-5-o-tolyl-3H-1,4-benzodiazepin-2(1H)-one in 75 ml. of glacial acetic acid was added and the mixture hydrogenated to completion (1405 cc. of hydrogen absorbed). Filtration and concentration of the filtrate under reduced pressure gave crude product which was dissolved in methylene chloride (150 cc.) and the resulting solution then washed with 5 N ammonium hydroxide solution (3 x 25 cc.), water (3 x 25 cc.), dried over anhydrous sodium sulfate, filtered and evaporated. Recrystallization from N,N-dimethylformamide/water yielded 7-chloro-4,5-dihydro-5-o-tolyl - 3H - 1,4 - benzodiazepin-2(1H)-one as white needles melting at 248–249°.

A solution of 10.0 g. of 7-chloro-4,5-dihydro-5-o-tolyl-3H-1,4-benzodiazepin-2(1H)-one in 30 ml. of N,N-dimethylformamide was stirred and refluxed for one hour with 2.07 g. of sodium methoxide (added in the form of a methanolic solution containing 4.35 mmoles of sodium methoxide per cc. of solution). The sodio derivative thus formed was treated with 49.4 g. of methyl iodide and the solution refluxed for a further two hours. After the excess methyl iodide had been distilled off, the reaction mixture was poured into 1000 ml. of water and extracted four times with 150 ml. portions of methylene chloride. The extracts were combined, treated with carbon, dried over anhydrous sodium sulfate and filtered. The solvent was then removed and the residual oil dissolved in a small volume of methanol and treated with an equivalent of hydrogen chloride, added as a methanolic hydrogen chloride solution (0.9 N). Solvent was then removed under reduced pressure and the residue recrystallized from methanol and ether yielding 7-chloro-1,4-dimethyl-5-o-tolyl-4,5-dihydro-3H-1,4-benzodiazepin-2(1H)-one hydrochloride as white prisms melting at 197–215°.

Example 137

1.0 g. of platinum oxide in 150 cc. of acetic acid was reduced at atmospheric pressure and room temperature. To the suspension of reduced catalyst a solution of 25.0 g. of 5-(2-fluorophenyl)-3H-1,4-benzodiazepin-2(1H)-one in 150 cc. of glacial acetic acid was added and the mixture hydrogenated to completion (2150 cc. of hydrogen absorbed). Filtration and concentration of the filtrate under reduced pressure gave crude product which was dissolved in methylene chloride (150 cc.). The resulting solution was then washed with a 5 N ammonium hydroxide solution (3 x 25 cc.), water (3 x 25 cc.), dried over anhydrous sodium sulfate, filtered and evaporated. Recrystallization of the residue from methylene chloride yielded 4,5-dihydro-5-(2-fluorophenyl)-3H - 1,4 - benzodiazepin-2(1H)-one as white needles melting at 162–163°.

Example 138

6 g. of 7-chloro-1-methyl-5-phenyl-3H-1,4-benzodiazepin-2(1H)-one was dissolved in 80 cc. of glacial acetic acid and was hydrogenated at atmospheric pressure and room temperature in the presence of 0.4 g. of a platinum oxide catalyst. After the calculated amount of hydrogen was absorbed (3 minutes) the solution was filtered and concentrated in vacuo to dryness. The residue was dissolved in ether and washed with dilute sodium hydroxide. The ether layer was then concentrated in vacuo and the residue recrystallized from a mixture of ether and petroleum ether yielding colorless prisms of 7-chloro-1-methyl-5 - phenyl - 4,5 - dihydro-3H-1,4-benzodiazepin-2(1H)-one melting at 144–145°.

A mixture of 10 g. of 7-chloro-4,5-dihydro-1-methyl-5-phenyl-3H-1,4-benzodiazepin-2(1H)-one and 7.9 g. of allyl bromide in N,N-dimethylformamide (50 cc.) was refluxed on a steam bath for 16 hours. Removal of the solvent under reduced pressure gave an oil which was taken up in ether and filtered through a short column of neutral grade I Woelm alumina (50 g.). The eluate was evaporated and the residue recrystallized from hexane yielding 4-allyl-7-chloro-4,5-dihydro-1-methyl-5 - phenyl-3H-1,4-benzodiazepin-2(1H)-one as white needles melting at 108.5–109°.

Example 139

A mixture of 15 g. of 7-chloro-4,5-dihydro-5-phenyl-3H-1,4-benzodiazepin-2(1H)-one and 3.32 g. of sodium methoxide (added in the form of a methanolic solution containing 4.35 mmoles of sodium methoxide per cc. of solution) in 50 cc. of N,N-dimethylformamide was heated on a steam bath for one hour. The solution was cooled and 19.2 g. of allyl bromide added. Heating was resumed for 15 hours and then the solvent was removed under reduced pressure. The residual oil was dissolved in 100 cc. of ether and filtered over neutral grade I Woelm alumina (50 g.). The ethereal eluate was treated with an equivalent of methanolic hydrogen chloride, concentrated and recrystallized from a methylene chloride/ether mixture giving 1,4-diallyl-7-chloro-4,5-dihydro-5-phenyl-3H-1,4-benzodiazepin-2(1H)-one hydrochloride as white needles melting at 190–191°.

Example 140

A mixture of 40.0 g. of 4,5-dihydro-5-phenyl-3H-1,4-benzodiazepin-2(1H)-one, 235.7 g. of methyl iodide and 200 ml. of N,N-dimethylformamide was heated on the steam bath for 30 minutes. Removal of the solvents under reduced pressure and recrystallization of the residue from ethanol gave 1,2,4,5-tetrahydro-4,4-dimethyl-2-oxo-5-phenyl-3H-1,4-benzodiazepinium iodide as white prisms melting at 190–191°.

30 g. of silver nitrate was dissolved in approximately 1 liter of water, and an excess of hydrochloric acid was added. The supernatant liquid was decanted and the precipitate thoroughly washed with water (10 x 500 cc.), decanting after each washing. 1 liter of water was then added and 20 g. of 1,2,4,5-tetrahydro-4,4-dimethyl-2-oxo-5-phenyl-3H-1,4-benzodiazepinium iodide added. The resulting mixture was stirred for 4 hours and filtered over a layer of Hyflo. The precipitate was washed with methanol. The washes and the filtrate were combined and concentrated under reduced pressure yielding a gum which was recrystallized from a methanol/ether mixture yielding 1,2,4,5-tetrahydro-4,4-dimethyl-2-oxo-5-phenyl-3H-1,4-benzodiazepinium chloride as white prisms melting at 199–201°.

Example 141

A solution of 16 g. of 7-chloro-5-(2-fluorophenyl)-4,5-dihydro-3H-1,4-benzodiazepin-2(1H)-one in 30 ml. of benzene and 10 ml. of N,N-dimethylformamide was refluxed for 15 minutes with 14.2 g. of methyl iodide. Excess methyl iodide was evaporated and 50 ml. of water added to the stirred reaction mixture, which was then allowed to cool. The mixture was diluted to 400 ml. with water and extracted four times with 100 ml. portions of methylene chloride. The combined extracts were filtered and dried over anhydrous sodium sulfate. Removal of the solvent and recrystallization of the residue from methylene chloride/petroleum ether (30–60°) gave 7 - chloro - 4 - methyl - 5 - (2 - fluorophenyl) - 4,5 - dihydro-3H-1,4-benzodiazepin-2(1H)-one as white prisms melting at 185.6°.

Example 142

A solution of 13 g. of 7-chloro-5-(2-fluorophenyl)-4,5-dihydro-3H-1,4-benzodiazepin-2(1H)-one in 30 ml. of N,N-dimethylformamide was stirred and refluxed for one hour with 2.7 g. of sodium methoxide (added in the form of a methanolic solution containing 4.35 mmoles of sodium methoxide per cc. of solution). The sodio derivative thus formed was treated with 20 ml. of methyl iodide and the solution refluxed for one hour. After the excess methyl iodide was distilled off, the reaction mixture was poured into 1000 ml. of water and extracted four times with 150 ml. portions of methylene chloride. The extracts were combined, treated with carbon, dried over anhydrous sodium sulfate, and filtered. Removal of the solvent and recrystallization of the residue from ether gave 7-chloro-1,4-dimethyl-5-(2-fluorophenyl)-4,5-dihydro-3H-1,4-benzodiazepin-2(1H)-one as white needles melting at 124–125°.

Example 143

A solution of 10 g. of 7-chloro-5-phenyl-4,5-dihydro-3H-1,4-benzodiazepin-2(1H)-one in 30 ml. of benzene and 10 ml. of N,N-dimethylformamide was refluxed for 1 hour with 13.2 g. of methyl iodide. Excess methyl iodide was evaporated, and 50 ml. of water was added to the filtered reaction mixture which was then allowed to cool. The mixture was diluted to 400 ml. with water and extracted 4 times with 100 ml. portions of methylene chloride. The combined extracts were filtered and dried over anhydrous sodium sulfate. Removal of the solvent and recrystallization of the residue from methylene chloride/petroleum ether (30–60°) gave 7-chloro-4-methyl-5-phenyl-4,5-dihydro-3H-1,4-benzothiazepin-2(1H)-one as white prisms melting at 205–205.5°.

A solution of 9.4 mmoles of sodium methoxide in methanol was added to a solution of 3 g. of 7-chloro-4-methyl - 5 - phenyl - 4,5 - dihydro - 3H - 1,4 - benzodiazepin-2(1H)-one, in a mixture of 20 ml. of methanol and 5 ml. of N,N-dimethylformamide. The resulting reaction mixture was refluxed for 30 minutes. A total of 15 ml. of methanol was distilled from the flask. The mixture was then cooled to 30° and 1 ml. of methyl iodide added. The resulting mixture was stirred and heated on the steam bath for 1 hour and then poured into 500 ml. of water. The product was extracted with three 50 ml. portions of methylene chloride, the extracts were combined, dried over anhydrous sodium sulfate, and the solvent removed under reduced pressure. The oil so obtained was then recrystallized from hexane to give 7-chloro-1,4-dimethyl-5-phenyl-4,5-dihydro-3H-1,4-benzodiazepin-2(1H)-one as white needles melting at 90–91°.

Another method for preparing 7-chloro-1,4-dimethyl-5-phenyl-4,5-dihydro-3H-1,4-benzodiazepin-2(1H)-one consisted of preparing a solution of 24 g. of 7-chloro-5-phenyl-4,5-dihydro-3H-1,4-benzodiazepin-2(1H)-one in 100 ml. of N,N-dimethylformamide and stirring and refluxing said solution for 1 hour with 4.86 g. of sodium methoxide (added in the form of a methanolic solution containing 4.35 mmoles of sodium methoxide per cc. of solution). The sodio derivative thus formed was treated with 127.8 g. of methyl iodide and the resulting solution refluxed for a further 2 hours. After the excess methyl iodide had been distilled off, the reaction mixture was poured into 1000 ml. of water and extracted 4 times with 150 ml. portions of methylene chloride. The extracts were combined, treated with carbon, dried over anhydrous sodium sulfate, and filtered. Removal of the solvent and recrystallization from hexane gave the product as white needles melting at 90–91°.

7 - chloro - 1,4 - dimethyl - 5 - phenyl - 4,5 - dihydro-3H-1,4-benzodiazepin-2(1H)-one was also prepared by refluxing a solution of 0.7 g. of 7-chloro-1-methyl-5-phenyl-4,5-dihydro-3H-1,4-benzodiazepin-2(1H)-one in 10 ml. of methanol for 1.5 hours with 1.02 g. of methyl iodide. The solvent was removed under reduced pressure and the residue taken up in ether, washed with water and dried over anhydrous sodium sulfate. The ether was removed and the oily residue crysallized from hexane yielding the desired product, which melted at 90–91°.

*Example 144*

A mixture of 10.0 g. of 7-chloro-4,5-dihydro-5-phenyl-3H-1,4-benzodiazepin-2(1H)-one, 14.2 g. of methyl iodide, 30 cc. of benzene and 10 cc. of N,N-dimethylformamide was heated at reflux on the steam bath for 30 minutes. Removal of the solvents under reduced pressure and recrystallization of the residue from methanol and ether gave 7-chloro-1,2,4,5-tetrahydro-4,4-dimethyl-2-oxo-5-phenyl-3H-1,4-benzodiazepinium iodide as colorless prisms melting at 231–240°. It was found that by lengthening the reflux period, higher yields of the quaternary product could be obtained. Thus when, as above, the reaction mixture was refluxed for 30 minutes, the yield was 5 percent of theory, but when the reaction mixture was maintained at reflux for 24 hours, the yield was 60 percent of theory. Also when the reaction mixture was maintained at reflux for 30 minutes, 50 percent of the starting material was recovered as 7-chloro-5-phenyl-4-methyl-4,5-dihydro-3H-1,4-benzodiazepin-2(1H)-one, but when the reaction mixture was refluxed for 24 hours, none of this latter product was obtained.

*Example 145*

A suspension of 8.0 g. of 7-bromo-5-(2-chlorophenyl)-4,5-dihydro-3H-1,4-benzodiazepin-2(1H)-one in 25 ml. of N,N-dimethylformamide was stirred and refluxed for one hour with 1.296 g. of sodium methoxide (added in the form of a methanolic solution containing 4.35 mmoles of sodium methoxide per cc. of solution). The sodio derivative thus formed was treated with 34 g. of methyl iodide, and the solution refluxed for a further two hours. After the excess methyl iodide had been distilled off, the reaction mixture was poured into 1000 ml. of water and extracted four times with 150 ml. portions of methylene chloride. The extracts were combined, treated with carbon, dried over anhydrous sodium sulfate and filtered. Removal of the solvent and recrystallization of the residue from ether gave 7-bromo-1,4-dimethyl-5-(2-chlorophenyl)-4,5-dihydro-3H-1,4-benzodiazepin-2(1H)-one as white prisms melting at 134–135°.

*Example 146*

A solution of 8.0 g. of 4,5-dihydro-5-phenyl-3H-1,4-benzodiazepin-2(1H)-one in 30 ml. of N,N-dimethylformamide was stirred and refluxed for one hour with 2.17 g. of sodium methoxide (added in the form of a methanolic solution containing 4.35 mmoles of sodium methoxide per cc. of solution). The sodio derivative thus formed was treated with 47.7 g. of methyl iodide and the solution refluxed for a further two hours. After the excess methyl iodide had been distilled off, the reaction mixture was poured into 1000 ml. of water and extracted four times with 150 ml. portions of methylene chloride. The extracts were combined, treated with carbon, dried over anhydrous sodium sulfate, and filtered. Removal of the solvent and recrystallization of the residue from methylene chloride yielded 1,4-dimethyl-4,5-dihydro-5-phenyl-3H-1,4-benzodiazepin-2(1H)-one as white prisms melting at 115–116°.

*Example 147*

To 1.125 moles of m-toluyl chloride heated to 120° was added in portions with stirring 0.5 mole of p-chloroaniline. The mixture was then heated to 180–200° and 0.64 mole of zinc chloride was added. The temperature was gradually increased to 220–230° and kept there until the hydrogen chloride evolution had ceased (1–2 hours). After cooling to 120°, 500 ml. of 3 N hydrochloric acid was cautiously added and the mixture stirred and heated to reflux. The hot acidic layer was decanted and this procedure repeated 2 or 3 times.

The water insoluble residue was refluxed for 16 hours with a mixture of 350 ml. of concentrated hydrochloric acid and 350 ml. of glacial acetic acid. The mixture was concentrated in vacuo and diluted with water. The organic material was extracted with four 300 ml. portions of methylene chloride, which were subsequently washed with 500 ml. portions of 3 N hydrochloric acid to remove the p-chloroaniline, and three 500 ml. portions of 5 N sodium hydroxide solution to remove the benzoic acid. The methylene chloride extract was dried over anhydrous sodium sulfate and the solvent removed to give crude 2-amino-5-chloro-3′-methyl-aminobenzophenone which was purified by chromatography in ether solution on a 10 fold amount of activated alumina. It was crystallized from a mixture of ether and petroleum ether (B.P. 30–60°) and formed yellow prisms melting at 90–91°.

A solution of 7.3 g. of 2-amino-5-chloro-3′-methylbenzophenone and 7 g. of glycine ethylester hydrochloride in 100 ml. of pyridine was refluxed for 20 hours. During the first few hours about 10 ml. of the solvent was slowly distilled off at atmospheric pressure. After 20 hours, the mixture was concentrated in vacuo and the residue taken up in a mixture of ether and water. The organic layer was separated, dried and concentrated in vacuo to dryness. The residue was crystallized from a mixture of benzene and petroleum ether and yielded 7-chloro-5-m-tolyl-3H-1,4-benzodiazepin-2(1H)-one which upon being recrystallized from the same solvent mixture formed colorless plates melting at 198–199°.

*Example 148*

A soltuion of 10.7 g. of 2-amino-5-fluorobenzophenone and 4.7 ml. of bromoacetyl bromide in 100 ml. benzene was stirred for one half hour while about 100 g. of ice was added in portions as to keep the temperature at around 10–15°. The organic layer was separated, washed with dilute ammonium hydroxide, dried, and concentrated in vacuo to a small volume. Petroleum ether was added to the concentrate, which was then filtered. After recrystallization of the precipitate from ether it formed colorless prisms of 2-bromoacetamido-5-fluorobenzophenone melting at 103–5°.

A solution of 20.5 g. of 2-bromoacetamido-5-fluorobenzophenone in about 300 ml. of liquid ammonia was stirred at reflux temperature for 5 hours until the ammonia had evaporated. The residue was dissolved in cold dilute hydrochloric acid and filtered. The filtrate was made alkaline with ammonium hydroxide and filtered. The precipitate was dissolved in 200 ml. ethanol and then refluxed for 1.5 hours, concentrated in vacuo to a small volume, ether added and the crystalline reaction product, 7-fluoro-5-phenyl-3H - 1,4-benzodiazepin-2(1H)-one, filtered off. After crystallization from a mixture of acetone and petroleum ether the material melted at 197–198°.

To a solution of 2.54 g. of 7-fluoro-5-phenyl-3H-1,4-benzodiazepin-2(1H)-one in 35 cc. of N,N-dimethylformamide was added a solution of 15 mmoles of sodium methoxide in 3 cc. of methanol. The mixture was stirred for one hour and then 60 mmoles of methyl iodide was added, whereupon the temperature rose to 30°, and the stirring was continued for 1½ hours. The solution was then poured into a mixture of ice and water and the reaction product was extracted with methylene chloride. The solution was dried with sodium sulfate, concentrated in vacuo and the residual oil recrystallized from ether yielding 7-fluoro-1-methyl-5-phenyl-3H-1,4-benzodiazepin-2(1H)-one as colorless prisms melting at 109–110°.

*Example 149*

To a stirred solution of 39.9 g of 2-amino-5-chloro-4'-chloro-benzophenone in 300 ml. of benzene were added in portions 18.7 ml. of bromoacetyl bromide and ice keeping the temperature at about 10–15°. After 30 minutes the organic layer was separated, washed with dilute ammonium hydroxide, dried and concentrated in vacuo to a small volume. Ether was added to the concentrate and crude reaction product was filtered off. After recrystallization from a mixture of benzene and ether it formed colorless prisms of 2-bromoacetamido-5-chloro-4'-chlorobenzophenone melting at 127–8°.

A solution of 39.5 g. of 2-bromoacetamido-5-chloro-4'-chlorobenzophenone in about 300 ml. of liquid ammonia was stirred at reflux temperature for 2 hours and then left at room temperature for 9 hours until the ammonia had evaporated. The residue was taken up in methylene chloride and water. The organic layer was separated, dried and concentrated in vacuo to a small volume. Petroleum ether was added to the concentrate and crude reaction product filtered off. After recrystallization from a mixture of methylene chloride and petroleum ether it formed colorless prisms of 2-aminoacetamido-5-chloro-4'-chlorobenzophenone melting at 139–40°.

The 2-aminoacetamido-5-chloro-4'-chlorobenzophenone mentioned above is not a part of this invention but its preparation is disclosed in order that the present disclosure may be complete.

A solution of 10 g. of 2-aminoacetamido-5-chloro-4'-chlorobenzophenone in 50 cc. pyridine was refluxed for 16 hours and then concentrated in vacuo to dryness. The residue was dissolved in ethanol, treated with carbon, filtered and the filtrate concentrated in vacuo to a small volume. The crude reaction product crystallized out and was filtered off. After recrystallization from ethanol it formed colorless prisms of 7-chloro-5-(p-chlorophenyl)-3H-1,4-benzodiazepin-2(1H)-one melting at 247–8°.

To a solution of 6.1 g. of 7-chloro-5-(p-chlorophenyl)-3H-1,4-benzodiazepin-2(1H)-one in 30 cc. of N,N-dimethylformamide was added a solution of 22 mmoles of sodium methoxide in methanol (5 cc.). The mixture was stirred for 1 hour, then 60 mmoles of methyl iodide was added. The temperature rose to 30° and the stirring was continued for 1½ hours. The solution was then poured into a mixture of ice and water, and the precipitated crystals were filtered off and dissolved in methylene chloride. The solution was dried with sodium sulfate, concentrated in vacuo and the residual oil recrystallized from ether yeilding 7-chloro-1-methyl-5-(p-chlorophenyl)-3H-1,4-benzodiazepin-2(1H)-one as colorless prisms melting at 154–156°.

*Example 150*

A solution of 5.4 g. of 7-chloro-5-phenyl-3H-1,4-benzodiazepin-2(1H)-one, 1.4 ml. of acrylonitrile and 2 drops of a 40 percent aqueous solution of benzyl-trimethylammonium bromide in 40 ml. of N,N-dimethylformamide was heated on the steam bath for 30 minutes. The reaction mixture was diluted with water and extracted with a mixture of benzene and ether. The organic layer was dried and concentrated in vacuo to dryness. The residue crystallized from a mixture of ether and petroleum ether yielding 7-chloro-1-(2-cyanoethyl)-5-phenyl-3H-1,4-benzodiazepin-2(1H)-one which after recrystallization from the above solvent mixture formed colorless prisms melting at 117–118°.

*Example 151*

A solution of 12.25 g. of 2-methylamino-5-chlorobenzophenone in 200 cc. of ether was treated with a total of 11.3 cc. of chloroacetyl chloride in several small portions. After each addition the reactants were allowed to stand for approximately five minutes and then, after washing the ether solution with water, the process was repeated. On completion of the addition the ether layer was washed with water, then with 5 percent sodium bicarbonate solution until neutral, and finally with water. Crystallized material was filtered off, washed with hexane and crystallized from methanol yielding 2-chloro-N-methylacetamido-5-chlorobenzophenone as colorless prisms melting at 123–124°.

A solution of 12 g. of 2-chloro-N-methylacetamido-5-chlorobenzophenone in 100 cc. of acetone was refluxed with 6.15 g. of sodium iodide for 20 minutes. After cooling, the mixture was filtered and the filtrate concentrated in vacuo. The residue was dissolved in a mixture of benzene and petroleum ether and the resulting solution filtered and then concentrated in vacuo to dryness. The residue was crystallized from a mixture of ethanol and petroleum ether and recrystallized from ether yielding 2-iodo-N-methylacetamido - 5 - chlorobenzophenone as colorless prisms melting at 95°.

A mixture of 5.0 g. of 2-iodo-N-methylacetamido-5-chlorobenzophenone in 22.5 ml. of methanol was added to 52.5 ml. of 15 percent methanolic ammonia solution (wght./vol.). This mixture was left for 45 minutes at room temperature then diluted with about 200 ml. of water and extracter with three 100 ml. portions of methylene chloride. The organic layer was washed free of ammonia, dried over sodiumm sulfate and allowed to stand at room temperature with charcoal for 2 hours. The solution was then filtered and concentrated in vacuo to an oil. The residue was crystallized from 25 ml. of ether yielding 71chloro-1-methyl-5-phenyl-3H-1,4-benzodiazepin-2(1H)-one as colorless plates melting at 125–126°.

Example 152

An ethereal solution was prepared from 70 g. of 2-amino-5-bromo-2'-fluorobenzophenone and to this was added a solution containing 21.5 ml. of bromoacetyl bromide in 50 ml. of ether. The mixture was washed with water, the aqueous layer was discarded, and the ether solution concentrated. The precipitate formed during the concentration was filtered off and the filtrate was treated twice more as before with portions as a bromoacetyl bromide-ether solution. The combined precipitates were washed well with water and recrystallized from methanol to give 2-bromoacetamido-5-bromo-2'-fluorobenzophenone as white needles melting at 139–140°.

2 - bromoacetamido - 5 - bromo - 2' - fluorobenzophenone (60 g.) was suspended in 1 liter of liquid ammonia and the ammonia allowed to evaporate over 15 hours. The resultant mixture was ground thoroughly with water so as to remove ammonium bromide, and then the product was crystallized from benzene-hexane to give 2-aminoacetamido-5-bromo-2'-fluorobenzophenone as white needles melting at 110–111°.

50. g. of 2-aminoacetamido-5-bromo-2'-fluorobenzophenone were fused in an oil bath at a temperature of 180°. The melt was maintained at this temperature until all evolution of water had ceased. Recrystallization of the reaction mixture from acetone afforded 7-bromo-5-(2 - fluorophenyl) - 3H - 1,4 - benzodiazepin - 2(1H)-one as white prisms melting at 186–187°.

The 2 - aminoacetamido - 5 - bromo - 2' - fluorobenzophenone mentioned above is not a part of this invention but its preparation is disclosed above in order that the instant disclosure may be complete.

Example 153

A mixture of 15 g. of 2-amino-5-chloro-2'-fluorobenzophenone, 5 ml. of chloroacetyl chloride and 500 ml. of ether was shaken for 5 minutes. The ethereal solution was filtered, washed with water, dried over anhydrous sodium sulfate and evaporated to a small volume. The crystalline product was filtered off, washed with water and recrystallized from methanol yielding 2-chloroacetamido-5-chloro-2'-fluorobenzophenone as white needles melting at 141–142°.

Example 154

To a solution of 8.6 g. of 2-aminobenzophenone in 100 cc. of ether was added in portions 11.5 g. of bromoacetyl bromide and simultaneously about 200 g. of ice water in order to keep the temperature at 10–15° and to dissolve the formed hydrogen bromide. After about 2 hours the ether solution was separated and washed neutral with water and cold sodium bicarbonate solution. It was then dried with sodium sulfate and concentrated in vacuo. The residue was recrystallized from methanol to yield 2-bromoacetamidobenzophenone as colorless needles melting at 94–95°.

Example 155

To a solution of 8.6 g. of 2-amino-3,5-dichlorobenzophenone in 100 cc. of ether was added in portions 11.5 g. of bromoacetyl bromide and simultaneously about 200 g. of ice water in order to keep the temperature at 10–15° and to dissolve the formed hydrogen bromide. After about 2 hours the ether solution was separated and washed neutral with water and cold sodium bicarbonate solution. It was then dried with sodium sulfate and concentrated in vacuo. The residue was recrystallized from methanol to yield 2-bromoacetamido-3,5-dichlorobenzophenone as colorless plates melting at 162–163°.

We claim:
1. A compound of the formula

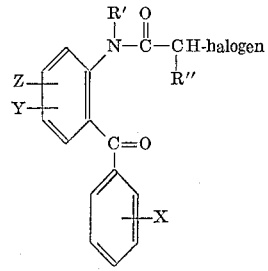

wherein R" is chosen from the group consisting of hydrogen and lower alkyl; R' is chosen from the group consisting of hydrogen, lower alkyl, lower alkenyl and phenyl-lower alkyl; and X, Y and Z are chosen from the group consisting of hydrogen lower alkyl and halogen.

2. 2-haloacetamido-5-halo-benzophenone.

3. 2 - (α - lower alkyl - haloacetamido) - 5 - halobenzophenone.

4. 2 - haloacetamido - 5,X' - dihalo - benzophenone wherein X is a whole integer from 2 to 4.

5. 2 - (α - lower alkyl - haloacetamido) - 5,X' - dihalobenzophenone wherein X is a whole integer from 2 to 4.

6. 2-haloacetamido-5,2'-dihalo-benzophenone.

7. 2 - (α - lower alkyl - haloacetamido) - 5,2' - dihalobenzophenone.

8. 2-chloroacetamido-5-chlorobenzophenone.

References Cited by the Examiner
UNITED STATES PATENTS 2,893,992  7/1959  Sternbach _____ 260—562 X

OTHER REFERENCES

Noller: "Chemistry of Organic Compounds," 2nd edition, pages 210–211 (1957).

Conant et al.: The Chemistry of Organic Compounds, 3rd edition, pages 143–44, N.Y., Macmillan, 1947.

WALTER A. MODANCE, *Primary Examiner.*

IRVING MARCUS, NICHOLAS S. RIZZO, *Examiners.*

R. PRICE, N. TROUSOF, *Assistant Examiners.*

Disclaimer 3,270,053.—*Earl Reeder*, Nutley, and *Leo Henryk Sternbach*, Upper Montclair, N.J. 2-(α-HALO-LOWER ALKANOYLAMINO)-BENZOPHENONES. Patent dated Aug. 30, 1966. Disclaimer filed Feb. 15, 1972, by the assignee, *Hoffmann-LaRoche Inc.*

Hereby enters this disclaimer to claim 1 of said patent.

[*Official Gazette July 25, 1972.*]